United States Patent
Fujiwara

(10) Patent No.: US 9,145,102 B2
(45) Date of Patent: Sep. 29, 2015

(54) VEHICLE SIDE AIRBAG DEVICE

(75) Inventor: Yusuke Fujiwara, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 13/982,644

(22) PCT Filed: Sep. 1, 2011

(86) PCT No.: PCT/JP2011/069952
§ 371 (c)(1),
(2), (4) Date: Jul. 30, 2013

(87) PCT Pub. No.: WO2013/031009
PCT Pub. Date: Mar. 7, 2013

(65) Prior Publication Data
US 2014/0159355 A1    Jun. 12, 2014

(51) Int. Cl.
| | |
|---|---|
| *B60R 21/233* | (2006.01) |
| *B60R 21/2338* | (2011.01) |
| *B60R 21/237* | (2006.01) |
| *B60R 21/231* | (2011.01) |
| *B60R 21/207* | (2006.01) |

(Continued)

(52) U.S. Cl.
CPC ............ *B60R 21/231* (2013.01); *B60R 21/233* (2013.01); *B60R 21/237* (2013.01); *B60R 21/23138* (2013.01); *B60R 21/207* (2013.01); *B60R 21/2342* (2013.01); *B60R 2021/23146* (2013.01); *B60R 2021/23316* (2013.01); *B60R 2021/23324* (2013.01); *B60R 2021/23382* (2013.01); *B60R 2021/23576* (2013.01)

(58) Field of Classification Search
CPC ............ B60R 21/23138; B60R 21/233; B60R 21/207; B60R 21/2338; B60R 21/237; B60R 21/231; B60R 2021/23308; B60R 2021/23316; B60R 2021/233; B60R 2021/23382; B60R 2021/237; B60R 2021/23324; B60R 2021/23146
USPC .............. 280/730.2, 729, 743.2, 743.1, 728.1
See application file for complete search history.

(56) References Cited

U.S. PATENT DOCUMENTS

| | | |
|---|---|---|
| 6,270,113 B1 | 8/2001 | Wipasuramonton et al. |
| 2002/0036402 A1 | 3/2002 | Heigl et al. |
| 2005/0218635 A1 | 10/2005 | Wipasuramonton et al. |
| 2006/0071458 A1 | 4/2006 | Sendelbach et al. |

(Continued)

FOREIGN PATENT DOCUMENTS

| | | |
|---|---|---|
| CN | 1933994 A | 3/2007 |
| DE | 19834666 A1 * | 2/1999 |

(Continued)

OTHER PUBLICATIONS

Mar. 12, 2015 Office Action issued in Chinese Application No. 201180068212.8.

*Primary Examiner* — Ketih Frisby
(74) *Attorney, Agent, or Firm* — Oliff PLC

(57) ABSTRACT

A vehicle side airbag device that is capable of reducing the number of panels for configuring a side airbag. A side airbag of the present side airbag device is configured with bag shaped airbag main body section formed by double folding a single-sheet panel, and stitching together around an outer peripheral edge portion. Moreover a tether section that segments the interior of the airbag main body section into a chest chamber and a hip chamber is also formed by partially folding over, superimposing and stitching the single-sheet panel.

11 Claims, 21 Drawing Sheets

(51) Int. Cl.
    *B60R 21/2342*     (2011.01)
    *B60R 21/235*     (2006.01)

(56) References Cited

U.S. PATENT DOCUMENTS

2011/0285119 A1   11/2011   Yamamoto et al.
2012/0248746 A1*  10/2012   Yamamoto ................... 280/729
2014/0167395 A1   6/2014    Yamamoto

FOREIGN PATENT DOCUMENTS

| | | |
|---|---|---|
| DE | 29919574 U1 | 3/2000 |
| EP | 0800962 A1 | 10/1997 |
| JP | A-2003-501303 | 1/2003 |
| JP | A-2005-531451 | 10/2005 |
| JP | A-2010-184595 | 8/2010 |
| JP | 2011126497 A * | 6/2011 |
| WO | 2011077510 A1 | 6/2011 |

* cited by examiner

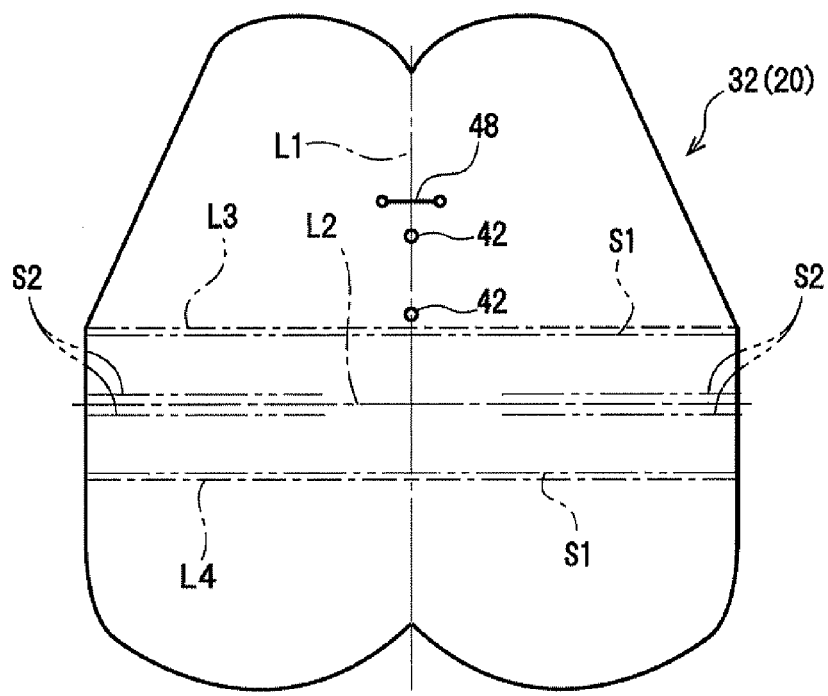
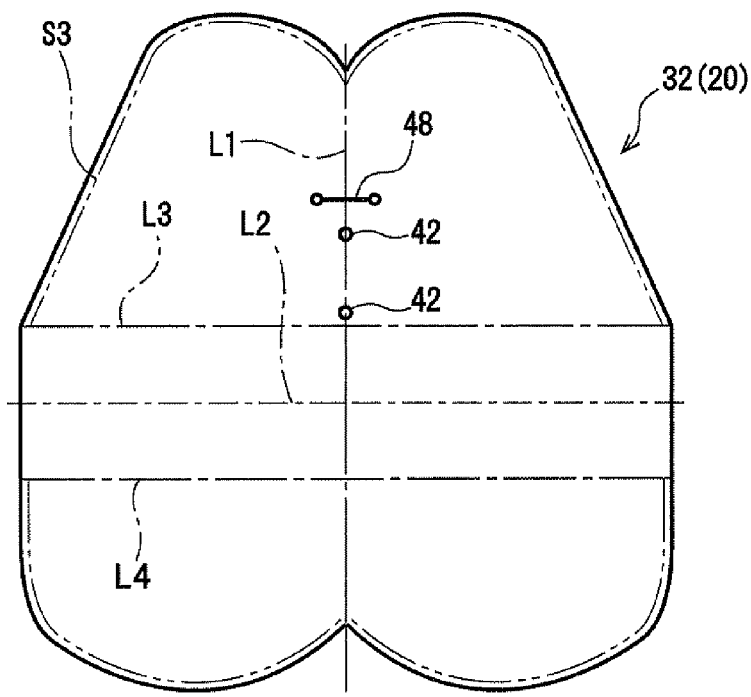

VEHICLE SIDE AIRBAG DEVICE

TECHNICAL FIELD

The present invention relates to a vehicle side airbag device, and in particular to a vehicle side airbag device equipped with a multi-chamber side airbag.

BACKGROUND ART

An airbag cut body disclosed in Patent Document 1 below is configured with plural cloth members (panels) that are upper/lower segmented and sewn together, and with a gas generation device holder made from two separate sheet cloth members. The multi-chamber airbag (side airbag) formed from the airbag cut body has a wall (tether section) formed so as to partition the interior of the side airbag into plural chambers (chambers) by stitching a portion of the plural panels mentioned above.

Patent Document 1: 2005-531451

DISCLOSURE OF INVENTION

Technical Problem

In a side airbag like the one described above, there is the possibility of the sewing operation becoming complicated due to the large number of panels. Moreover, a separate panel (reinforcement panel) is also required in order to prevent damage from the high temperature and high pressure gas ejected from a gas generation device (inflator). There is accordingly room for improvement in further reducing manufacturing cost, and improving the applicability to mass production.

In consideration of the above issues, an object of the present invention is to obtain a vehicle side airbag device capable of reducing the number of panels configuring the side airbag.

Solution to Problem

A vehicle side airbag device according to a first aspect of the invention includes: a side airbag in which a bag shaped airbag main body section is formed by double folding a single-sheet panel and stitching together outer peripheral edge portions of the single-sheet panel, and in which the interior of the airbag main body section is sectioned into plural upper and lower chambers by one tether section or plural tether sections by partially folding over, superimposing and stitching the panel; and an inflator that supplies gas into the plural chambers when a vehicle is involved in a side-on collision.

In the vehicle side airbag device according to the first aspect of the invention, the interior of the airbag main body section in the side airbag is segmented into the plural upper and lower chambers by the one tether section or the plural tether sections. Gas is supplied from the inflator into the plural chambers during a vehicle side-on collision. The airbag main body section is thereby inflated and deployed. In the side airbag described above, the airbag main body section and the tether section are formed by stitching together a single-sheet panel. Moreover, the tether section is formed by partially folding over, superimposing and stitching the above single-sheet panel, and hence the number of reinforcement panels (reinforcement cloth) for reinforcing the tether section can be reduced, or such reinforcement panels can be omitted altogether. The number of panels configuring the side airbag can accordingly be reduced.

A vehicle side airbag device according to a second aspect of the invention is the vehicle side airbag device according to the first aspect of the invention, wherein a surplus length section is formed in an elongated tube shape by folding over and superimposing an up-down direction intermediate portion of the panel, such that there is slack on the interior side of the airbag main body section, and stitching on the side of the surplus length section near to the front face of the airbag main body section, and the tether section is formed by stitching together the surplus length section at two length direction sides of a fold line of the double folding at a side of the surplus length section away from the front face of the airbag main body section.

In the vehicle side airbag device according to the second aspect of the invention, the surplus length section is formed in an elongated tube shape by folding over and superimposing the up-down direction intermediate portion of the single-sheet panel, and the tether section is formed by stitching together the two length direction sides of the surplus length section. Thus, the gas sealing capability of the airbag main body section can still be maintained even supposing the stitching thread of the tether section was to break with rising internal pressure of the plural chambers. Moreover, there is no need for 3D stitching since the side airbag can be manufactured by stitching in a flat plane, thereby enabling an easy stitching operation to be achieved.

A vehicle side airbag device according to a third aspect of the invention is the vehicle side airbag device according to the second aspect of the invention, wherein a communicating section that communicates upper and lower chambers through the tether section is formed by not stitching together the two length direction sides of the surplus length section on the fold line side or on the side opposite to the fold line, and the inflator is inserted into the communicating section.

In the vehicle side airbag device according to the third aspect of the invention, there is no stitching together at the two length direction sides of the surplus length section on the fold line side where the panel is double folded or on the opposite side to the fold line. The communicating section is accordingly formed so as to communicate the upper and lower chambers through the tether section, and the inflator is inserted into the communicating section. Placement space for the inflator can accordingly be secured with a simple configuration.

A vehicle side airbag device according to a fourth aspect of the invention is the vehicle side airbag device according to the first aspect of the invention, wherein the inflator is disposed inside an inner tube inserted into the communicating section, gas ejected from the inflator is distributed to the upper and lower chambers by the inner tube, a lower end side of the inner tube projects out into a chamber below the tether section, and the lower chamber is configured to deploy earlier and at a higher pressure than a chamber above the tether section.

In the vehicle side airbag device according to the fourth aspect of the invention, the inner tube is inserted into the communication section communicating the upper and lower chambers together through the tether section, and the gas ejected from the inflator disposed inside the inner tube is distributed to the upper and lower chambers by the inner tube. Moreover, the chamber below the tether section (the lower chamber) deploys earlier and at a higher pressure than the chamber above the tether section (the upper chamber), and for example early and good restraint of the hip region of an occupant, which is more robust than the chest region of the occupant, can be achieved by the lower chamber. The initial restraining performance can thereby be raised for the occupant hip region. The bottom end side of the inner tube also projects out into the lower chamber, and so the bottom end side of the inner tube is squashed in and closed off by rising internal pressure of the lower chamber. Gas inside the lower chamber can thereby be prevented from inflowing through inside the inner tube and into the upper chamber. Namely, the inner tube can be made to function as a non-return valve, enabling the internal pressure of the lower chamber to be maintained in a high pressure state.

A vehicle side airbag device according to a fifth aspect of the invention is the vehicle side airbag device according to the first aspect of the invention, wherein: cutout sections are formed at the panel in a flat opened-out state at the two sides of a fold line of the double folding with the cutout sections respectively open towards the opposite sides from the fold line; an elongated surplus length section is formed by folding over and superimposing an up-down direction intermediate portion of the panel including edge portions of the pair of cutout sections, such that there is slack on the interior side of the airbag main body section, and stitching on the side of the surplus length section near to the front face of the airbag main body section; the tether section and a non-return valve section are formed by stitching together the surplus length section along edge portions of the cutout sections at the two length direction sides of the fold line at the sides away from the front face of the airbag main body section; and chambers above and below the tether section are in communication with each other through the inside of the non-return valve section.

In the vehicle side airbag device according to the fifth aspect of the invention the tether section and the non-return valve section can be configured from a single-sheet panel, and separate bodies of the inner tube for distributing gas to the chambers above and below the tether section and the non-return valve can be dispensed with. Consequently, the number of panels for configuring the side airbag can be reduced. The non-return valve section that is exposed to the high temperature and high pressure gas ejected from the inflator is in a triple-sheet superimposed state due to the up-down direction intermediate portion of the folded and superimposed panel for configuring the tether section and the non-return valve section (a double-sheet superimposed portion) and the location of the panel for configuring the airbag main body section. The number of reinforcement panels (reinforcement cloth) for reinforcing the non-return valve section can accordingly be reduced, or such reinforcement panels can be omitted altogether. The number of panels can accordingly be reduced even when a configuration provided with a non-return valve section is adopted.

A vehicle side airbag device according to a sixth aspect of the invention is the vehicle side airbag device according to the fifth aspect of the invention, wherein the non-return valve section projects out into a chamber below the tether section: and configuration is made such that the lower chamber is deployed earlier and at higher pressure than a chamber above the tether section.

In the vehicle side airbag device according to the sixth aspect of the invention, the non-return valve section is squashed in so as to be closed off by rising internal pressure of the lower chamber due to the non-return valve section projecting out into the chamber below the tether section. The internal pressure of the lower chamber can accordingly be maintained at a higher pressure than the internal pressure of the upper chamber with a simple configuration. Moreover, since the lower chamber deploys earlier and at higher pressure than the upper chamber, this enables early and good restraint to be achieved by the lower chamber for the hip region of the occupant, which is more robust than the chest region of the occupant. This enables the initial restraining performance to the occupant hip region to be enhanced.

A vehicle side airbag device according to a seventh aspect of the invention is the vehicle side airbag device according to the second to sixth aspects of the invention, wherein the side airbag includes a bag thickness changing section that increases a thickness dimension of the airbag main body section in a vehicle width direction when internal pressure in at least one of the chambers above or below the tether section reaches a set value.

In the vehicle side airbag device according to the seventh aspect of the invention, the thickness dimension of the airbag main body section in the vehicle width direction (referred to below as the "bag thickness") can be increased by the bag thickness changing section when, for example, what is referred to as a pole side impact test is performed (a crash test modeling a case in which the side face of a vehicle collides with a utility pole or the like, in which the side face of a vehicle is impacted against a stationary pole). Namely, in a pole side impact, due to local vehicle deformation, a comparatively large gap is secured between the occupant and a vehicle body side portion (such as door trim of a side door). In such cases, the bag thickness changing section increases the bag thickness of the airbag main body section after the airbag main body section has been inflated and deployed into the above gap, by the internal pressure of the at least one of the chambers above and below the tether section reaching the set value. The occupant can hence be effectively protected from the impact of a pole side impact since the impact absorption stroke of the airbag main body section can accordingly be increased.

However, a vehicle body deforms over a wide range (surface area) when what is referred to as a Moving Deformable Barrier (MDB) side impact test is performed (a crash test in which a barrier modeling another vehicle is impacted against the side face of a stationary vehicle), and the gap between the occupant and a vehicle body side portion becomes much narrower than in a pole side impact. Even in such cases, in the present invention the airbag main body section can be inflated and deployed into the narrow gap between the occupant and the vehicle body side portion. Namely, in the present exemplary embodiment, since the bag thickness changing section does not increase the bag thickness of the airbag main body section until the internal pressure of the at least one out of the chambers above and below the tether section reaches the set value, it is possible to inflate and deploy the airbag main body section into the gap between the occupant and the vehicle body side portion even when the gap is narrow. An occupant can accordingly be protected from the impact of an MDB side impact.

A vehicle side airbag device according to an eighth aspect of the invention is the vehicle side airbag device according to the seventh aspect of the invention, wherein the bag thickness changing section is a tear seam section configured by a stitched section on the side of the surplus length section near to the front face of the airbag main body section that is made weaker than other stitched sections, and is configured such that the tear seam section ruptures in a case in which the at least one internal pressure reaches the set value.

In the vehicle side airbag device according to the eighth aspect of the invention, the tear seam section configured by the stitched section on the side of the surplus length section near to the front face of the airbag main body section ruptures when the internal pressure of the at least one of the chambers in the side airbag above and below the tether section reaches the set value. The surplus length section is thereby deployed and the thickness dimension of the airbag main body section increases in the vehicle width direction. Since the bag thickness changing section is configured by the tear seam section, the bag thickness changing section can be provided using a simple configuration of simply changing the stitching thread or the stitching pattern.

A vehicle side airbag device according to a ninth aspect of the invention is the vehicle side airbag device according to the seventh aspect of the invention, wherein the bag thickness changing section is an intermittent stitched section configured by a multi-division stitched section on the side of the surplus length section near to the front face of the airbag main body section with one or more non-stitched sections provided between the divided stitched sections, configured such that the airbag main body section starts to inflate at the one or more non-stitched sections in a case in which the at least one internal pressure reaches the set value.

In the vehicle side airbag device according to the ninth aspect of the invention, the stitched section on the side of the surplus length section of the side airbag near to the front face of the airbag main body section is multi-divisional, with the non-stitched section provided between the plural stitched sections. The airbag main body section is configured to start to inflate at the non-stitched section when the internal pressure of the at least one of the chambers above and below the tether section reaches the set value. Due to this, the surplus length section at the periphery of and including the non-stitched section opens out, thereby increasing the bag thickness of the airbag main body section. Since the intermittent stitched section (the bag thickness changing section) is configured thus by providing the non-stitched section between the plural stitched sections, the bag thickness changing section can be provided with a simple configuration of simply changing the stitching pattern.

A vehicle side airbag device according to a tenth aspect of the invention is the vehicle side airbag device according to the eighth or ninth aspects of the invention, wherein a vent hole is formed in a location of the panel configuring one face of the surplus length section.

In the vehicle side airbag device according to the tenth aspect of the invention, the vent hole is formed in a location of the panel that forms one face of the surplus length section, namely the vent hole is formed in one of the portions where the panel is folded over and superimposed. The vent hole is normally closed off by the location forming the other face of the surplus length section in the panel, namely the other portion of the folded over and superimposed panel. The airbag main body section deployed between the occupant and the door trim is compressed between the two members when the door trim intrudes into the vehicle compartment during a side-on impact of the vehicle. Accompanying this, the surplus length section is opened out by the bag thickness changing section when the internal pressure of the at least one of the chambers above and below the tether section reaches the set value, opening the vent hole. The internal pressure of the airbag main body section is hence prevented or suppressed from rising excessively since gas inside the airbag main body section is accordingly externally discharged through the vent hole.

A vehicle side airbag device according to an eleventh aspect of the invention is the vehicle side airbag device according to the second to tenth aspects of the invention, wherein the interior of the airbag main body section is sectioned by the tether section into an upper chamber and a lower chamber, and the panel is configured by stitching or joining together in advance an upper side base cloth that configures the upper chamber and a lower side base cloth that is provided with a lower gas permeability than the upper side base cloth and that configures the lower chamber and the tether section.

In the vehicle side airbag device according to the eleventh aspect of the invention, a single-sheet panel is configured from the upper side base cloth for configuring the upper chamber and the lower side base cloth for configuring the lower chamber and the tether section, which have been stitched or joined together in advance. Due to providing the lower side base cloth with a gas permeability lower than that of the upper side base cloth, the internal pressure of the lower chamber can be set at a higher pressure, and the internal pressure of the upper chamber can be set at a lower pressure. Thus, for example, good restraint of the hip region of the occupant, which is more robust than the chest region of the occupant, can accordingly be achieved by the lower chamber.

Advantageous Effects of Invention

As explained above, in the vehicle side airbag device according to the present invention, the number of panels configuring a side airbag can be reduced.

BRIEF DESCRIPTION OF DRAWINGS

FIG. 3A and FIG. 3B: FIG. 3A is a flat opened-out plan of a panel for configuring the same side airbag device, as viewed from the back-face side; and FIG. 3B is a flat opened-out plan, as viewed from the front-face side of the same panel.

FIG. 4A is a perspective view illustrating a stitched state of a first stitched section of the same panel; and FIG. 4B is a perspective view of the panel illustrated in FIG. 4A, as viewed from a different angle to that of FIG. 4A.

FIG. 5A is a perspective view illustrating a stitched state of a second stitched section of the same panel; and FIG. 5B is a perspective view of the panel illustrated in FIG. 5A, as viewed from a different angle to that of FIG. 5A.

FIG. 9A is a flat opened-out plan, as viewed from the back-face side of a panel configuring the same side airbag; and FIG. 9B is a flat opened-out plan, as viewed from the front face side of the same panel.

BEST MODE FOR CARRYING OUT THE INVENTION

First Exemplary Embodiment

Explanation follows regarding a vehicle side airbag device 10 (referred to below simply as the side airbag device 10) according to a first exemplary embodiment of the present invention, with reference to FIG. 1 to FIG. 7. Note that in FIG. 1, the arrow FR indicates a vehicle forwards direction and the arrow UP indicates a vehicle upwards direction.

Figure 1:
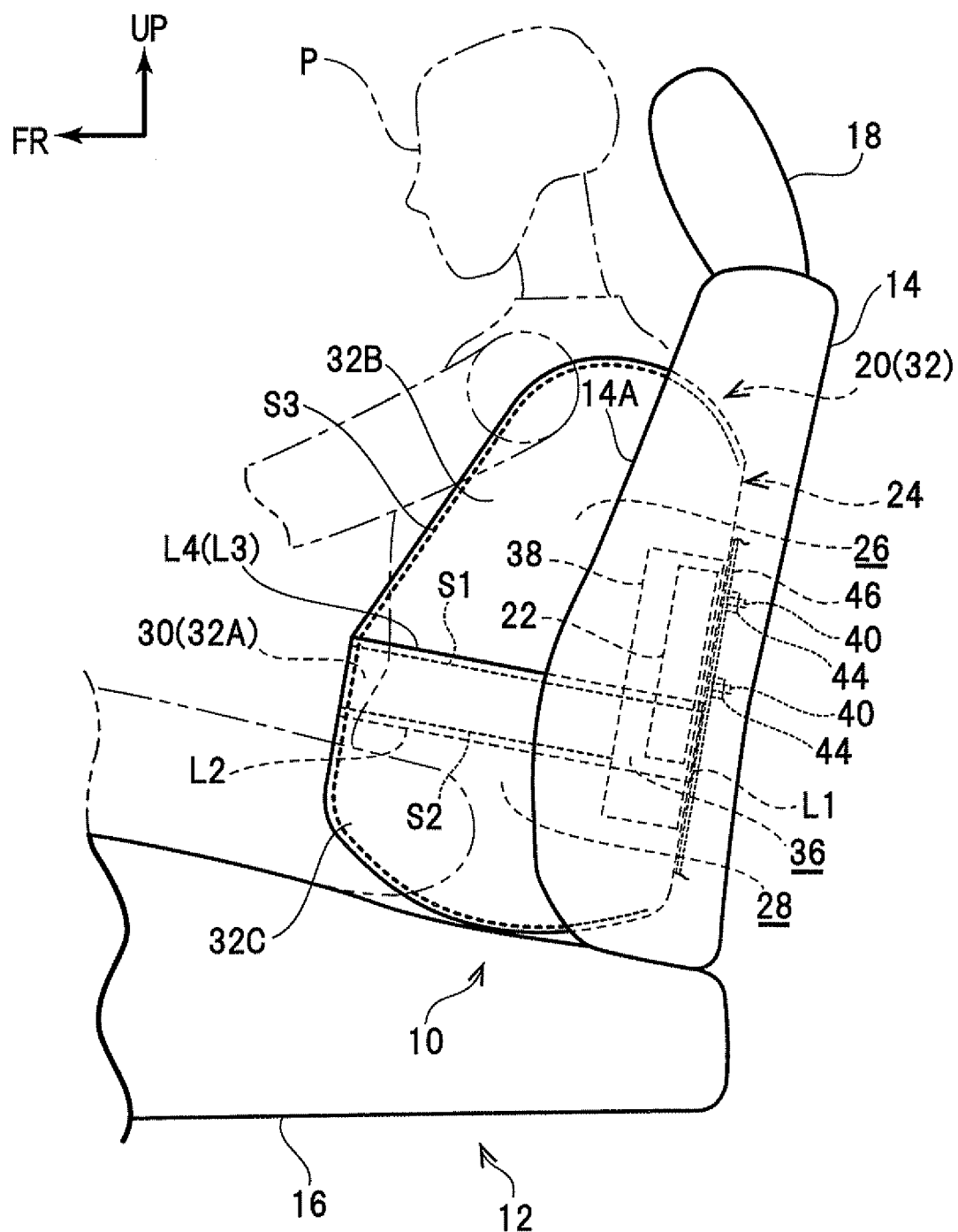
FIG. 1 is a side view illustrating a configuration of relevant portions of a vehicle seat installed with a vehicle side airbag device according to a first exemplary embodiment of the present invention.

As illustrated in FIG. 1, the side airbag device 10 according to the first exemplary embodiment is installed to a door-side side section 14A (a side section on a non-illustrated side door side) of a seatback 14 in a vehicle seat 12. The seatback 14 is tiltably connected to a rear edge portion of a seat cushion 16, and a headrest 18 is connected to an upper end portion of the seatback 14. Note that in the present exemplary embodiment the forward direction, upward direction and width direction of the vehicle seat 12 are aligned with the forward direction, upward direction and width direction of a vehicle.

The side airbag device 10 is equipped with a side airbag 20 and an inflator 22 that serves as a gas supply unit for generating gas inside the side airbag 20. The side airbag 20 unitized in a folded state together with the inflator 22 and the like is disposed inside the door-side side section 14A. Note that FIG. 1 illustrates a state in which the side airbag 20 has been inflated and deployed with gas pressure generated by the inflator 22 (a deployment complete state). Moreover, although not shown in the drawings, a seat bag pad (urethane pad) covered with a seat cover is disposed at the periphery of the side airbag device 10, and a sewn together portion of the seat cover and the seat bag pad are configured to tear open when the side airbag 20 is being inflated and deployed.

Figure 2:
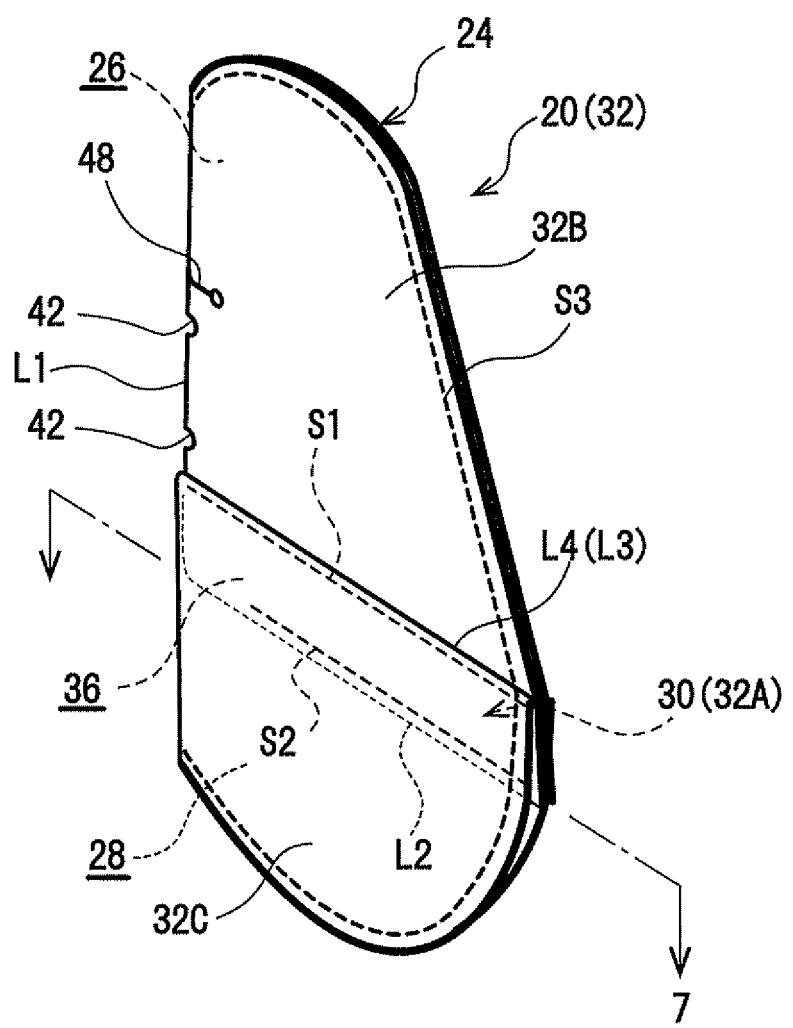
FIG. 2 is a perspective view of a side airbag that is a configuration member of the same side airbag device.

As illustrated in FIG. 2, the side airbag 20 is what is referred to as a two-chamber side airbag, and is configured by an airbag main body section 24 formed in a bag shape, and a tether section 30 (separation wall section/partitioning wall section) that segments the interior of the airbag main body section 24 into a chest chamber 26 (upper chamber) and a hip chamber 28 (lower chamber). The side airbag 20 is formed by sewing a single-sheet panel 32 as illustrated in FIG. 3A, FIG. 3B, FIG. 4A, FIG. 4B, FIG. 5A, FIG. 5B and FIG. 6.

More specifically, the bag shaped airbag main body section 24 is formed by double folding the single-sheet panel 32 along a central fold line L1 that extends along an up-down direction (double folding fold line), and sewing a third stitched section S3 (third stitch line) around an outside edge portion. Moreover, an up-down direction intermediate portion (in the vicinity of an up-down direction central portion) of the panel 32 is folded and superimposed such that there is slack towards the inside of the airbag main body section 24, and formed with an elongated tube shaped surplus length section 32A (see FIG. 4A and FIG. 4B) by sewing along a first stitched section S1 (first stitch line) provided on the side of the surplus length section 32A near to the front face of the airbag main body section 24. The tether section 30 is then formed by sewing a second stitched section S2 (second stitch line) provided at the side of the surplus length section 32A away from the front face of the airbag main body section 24 with the two length direction sides of the surplus length section 32A folded about the central fold line L1.

The above second stitched section S2 does not reach as far as the central fold line L1, and the two length direction sides of the surplus length section 32A are not stitched on the central fold line L1 side. A communicating section 36 (see FIG. 7) is accordingly formed to communicate the chest chamber 26 with the hip chamber 28 (note that hatching on the cross-section of the panel 32 is omitted in FIG. 7 for ease of explanation). A tube shaped stitched inner tube 38 (see FIG. 1, not shown in the drawings other than FIG. 1) is inserted into the communicating section 36. The inner tube 38 is disposed in a state with its axis direction oriented along the seatback 14 up-down direction and with its lower end side projecting out into the hip chamber 28. The inflator 22 (see FIG. 1, not shown in the drawings other than FIG. 1) is inserted inside the inner tube 38.

The inflator 22 is formed in a circular cylindrical shape, disposed with its axis direction oriented along the seatback 14 up-down direction. An upper and lower pair of stud bolts 40 project out from an outer peripheral portion of the inflator 22 towards the vehicle rear side. The stud bolts 40 are inserted through attachment holes, not shown in the drawings, formed in the inner tube 38, are inserted through an upper and lower pair of attachment holes 42 (see FIG. 3A and FIG. 3B) formed in the panel 32 on the central fold line L1, and are also inserted through attachment holes, not shown in the drawings, formed in a side frame 46 of a seatback frame. The leading end sides of the stud bolts 40 are screwed into nuts 44. The inflator 22 is thereby fixed to the inner tube 38 and the side airbag 20, and also to the side frame 46. Note that, as illustrated in FIG. 3A and FIG. 3B, a slit 48 is formed in the panel 32 at an upper side of the pair of attachment holes 42, for inserting the inflator 22 and the inner tube 38 into the airbag main body section 24.

A side airbag ECU and a side airbag sensor (both not shown in the drawings) installed to the vehicle are electrically connected to the inflator 22. The side airbag ECU determines whether or not to actuate the side airbag device 10 based on detection signals from the side airbag sensor when the vehicle is involved for example in a side-on collision or lateral roll. A specific current is caused to flow to the inflator 22 when this determination is positive. The inflator 22 is actuated thereby, and gas is ejected from a gas ejection opening, not shown in the drawings, provided at a lower end side of the inflator 22.

Gas ejected from the inflator 22 flows into the chest chamber 26 through an upper end opening portion of the inner tube 38, and also flows into the hip chamber 28 through a lower end opening portion of the inner tube 38. Namely, the inner tube 38 functions as a diffuser for distributing gas ejected from the inflator 22 to the chest chamber 26 and the hip chamber 28.

Thus, as illustrated in FIG. 1, the airbag main body section 24 (the side airbag 20) is inflated and deployed towards the front of the seatback 14 and in the seatback 14 up-down directions.

More specifically, the hip chamber 28 is inflated and deployed between the hip region of an occupant P seated on the vehicle seat 12 and the door trim of a side door (not shown in the drawings), such that the hip region of the occupant P is restrained by the hip chamber 28. The chest chamber 26 is also inflated and deployed between the chest region of the occupant P and the door trim of the side door, such that the chest region of the occupant is restrained by the chest chamber 26. In such cases, configuration is made such that the hip chamber 28 completes deployment earlier than (in advance of) the chest chamber 26 by disposing the gas ejection outlet of the inflator 22 so as to face downwards. Moreover, configuration is made such that the internal pressure of the hip chamber 28 becomes higher than the internal pressure of the chest chamber 26. The lower end side of the inner tube 38 is pressed and squashed in so as to be closed off when the internal pressure of the hip chamber 28 reaches a specific value or greater. Gas in the hip chamber 28 is thus prevented from flowing (inflowing) in to the chest chamber 26 through the inner tube 38. Namely, the inner tube 38 is configured to function as a non-return valve that prevents inflow of gas from inside the hip chamber 28 into the chest chamber 26.

Manufacturing Method of the Side Airbag 20

Explanation follows regarding a manufacturing method of the above side airbag 20.

Figure 4A:
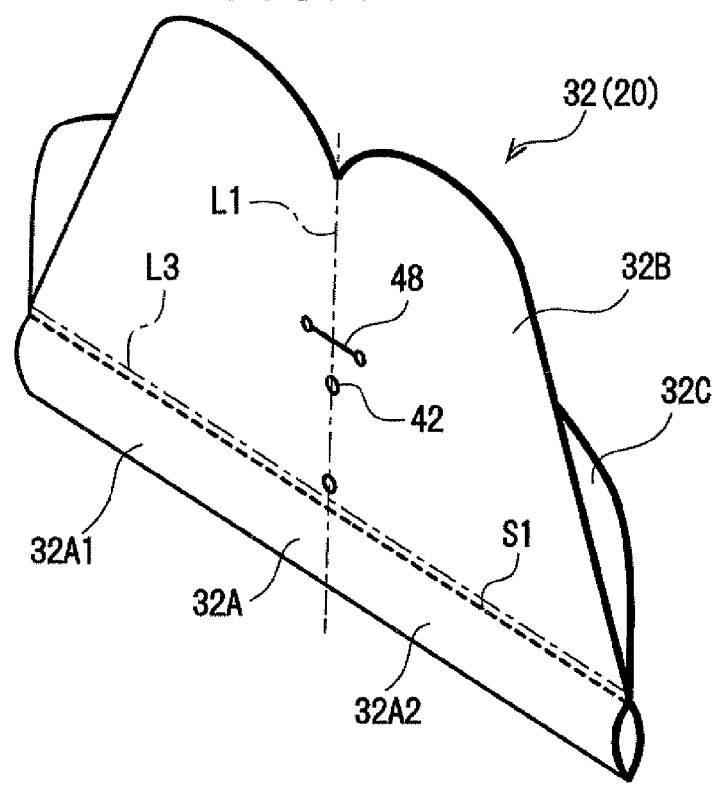
FIG. 4A and FIG. 4B.
Figure 4B:
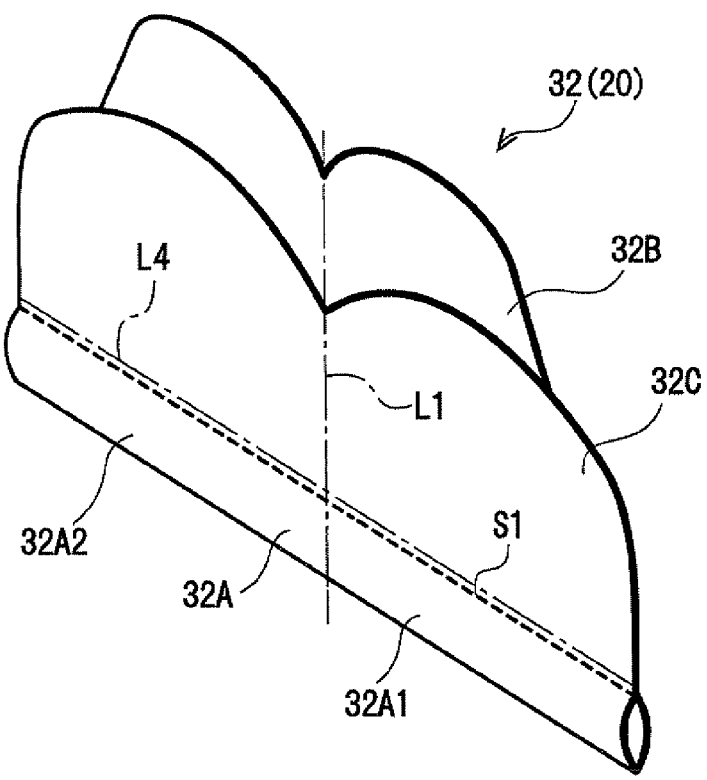

When the side airbag 20 is being manufactured, first, as illustrated in FIG. 3A and FIG. 3B, the single-sheet panel 32 is folded at a fold line L2 extending along the left-right direction, such that the back face of the panel 32 is on the inside. Then, as illustrated in FIG. 4A and FIG. 4B, the panel 32 is sewn along the fold line L2 at the first stitched section S1 provided at a specific separation from the fold line L2. The elongated tube shaped surplus length section 32A is thereby formed to extend along the panel 32 left-right direction at an up-down direction intermediate portion (in the vicinity of the up-down direction central portion) of the panel 32. One side of the surplus length section 32A in the panel 32 thereby configures an upper panel section 32B for forming the chest chamber 26, and the other side of the surplus length section 32A in the panel 32 configures a lower panel section 32C for forming the hip chamber 28. Note that, as illustrated in FIG. 3A and FIG. 3B, a fold line L3 provided to the upper panel section 32B in the vicinity of the first stitched section S1 is set so as to run along the first stitched section S1, and a fold line L4 provided to the lower panel section 32C in the vicinity of the first stitched section S1 is set so as to run along the first stitched section S1.

Figure 5A:
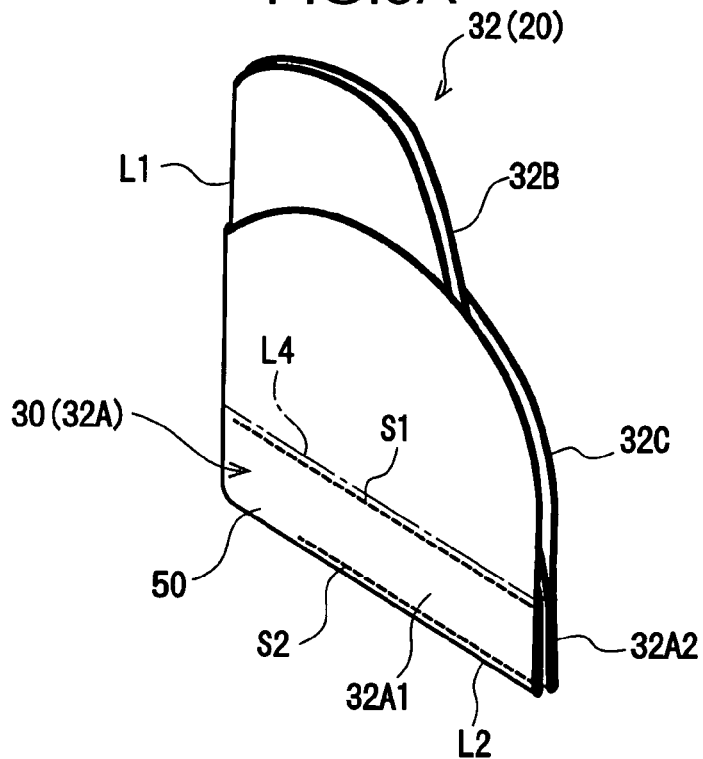
FIG. 5A and FIG. 5B.
Figure 5B:
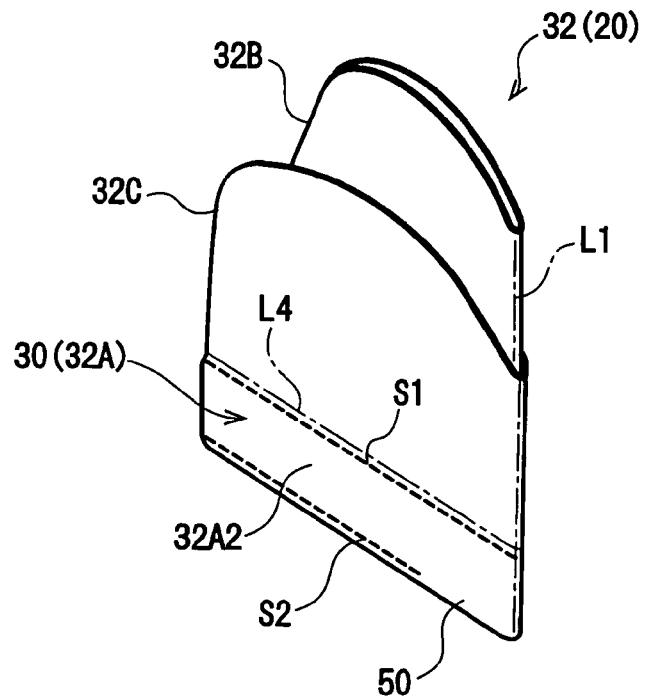

Then, as illustrated in FIG. 5A and FIG. 5B, the panel 32 is folded double at the central fold line L1 that extends along the up-down direction, such that the upper panel section 32B is on the inside. The two length direction ends of the surplus length section 32A about the central fold line L1 (the length direction one side 32A1 and the length direction other side 32A2) are thereby superimposed on each other. Stitching is performed in this state along the fold line L2 at the second stitched section S2 set on the sides (the fold line L2 sides) of the length direction one side 32A1 and the length direction other side 32A2 away from the front face of the airbag main body section 24. This thereby forms the tether section 30. However, the second stitched section S2 is not provided at the central fold line L1 side of the two length direction sides of the surplus length section 32A, and instead a non-stitched section 50 is provided in order to form the communicating section 36 mentioned above.

Figure 6:
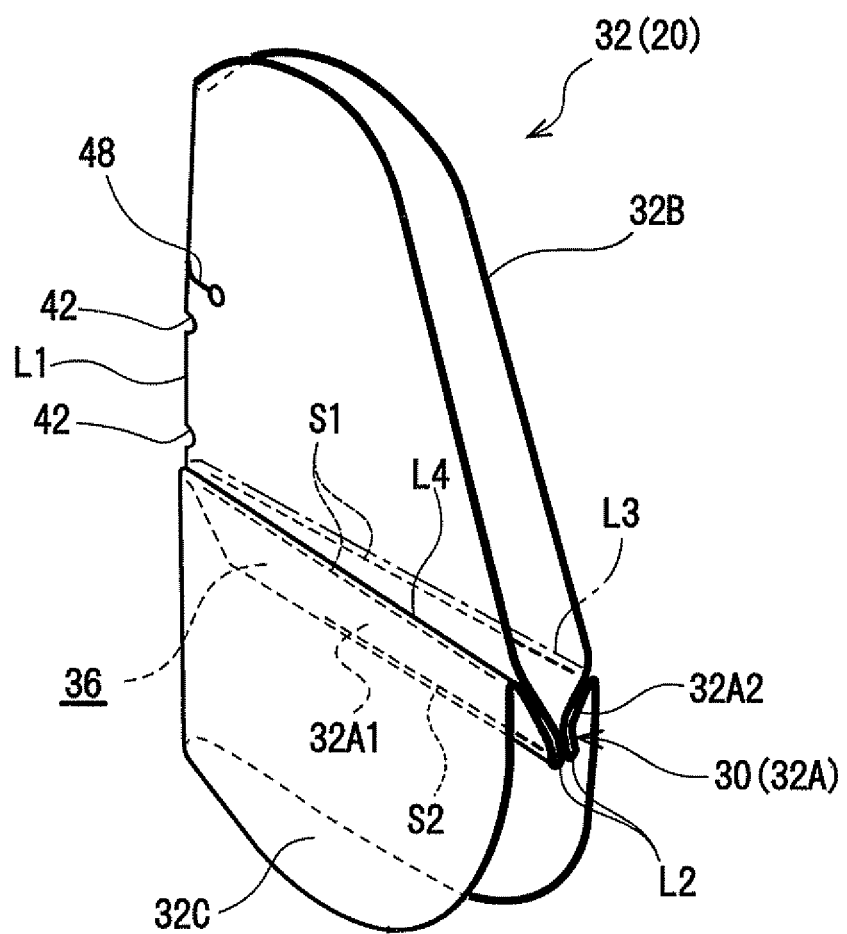
FIG. 6 is a perspective view illustrating a state prior to stitching of a third stitched section of the same panel.
Figure 7:
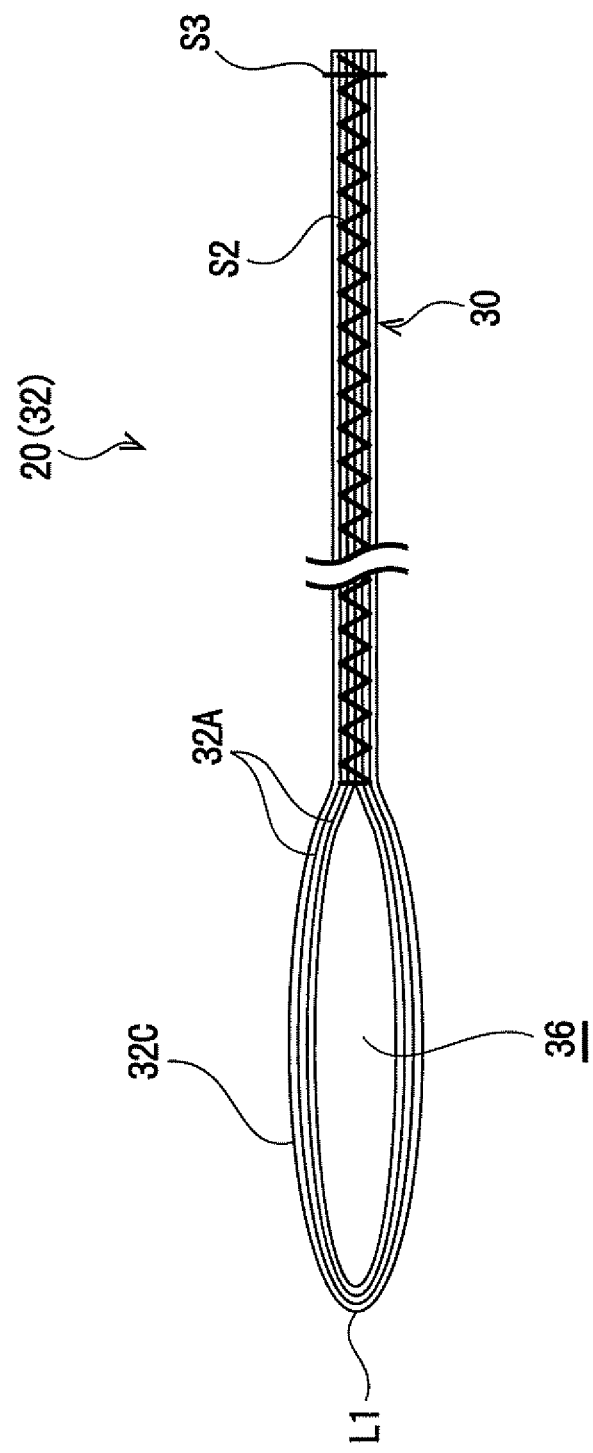
FIG. 7 is an enlarged cross-section illustrating a section taken on line 7-7 of FIG. 2.

Then, as illustrated in FIG. 6, the lower panel section 32C is folded back at the fold line L4 such that the upper panel section 32B and the lower panel section 32C are disposed on opposite sides of the surplus length section 32A to each other. Then, as illustrated in FIG. 2, stitching is performed at the third stitched section S3 at locations on the outer peripheral edge portion of the panel 32 other than on the central fold line L1 side. This completes manufacture of the side airbag 20 according to the present exemplary embodiment. Note that the stitching referred to above is all performed by stitching in a flat plane.

Finally, the stud bolts 40 of the inflator 22 are inserted into the two attachment holes, not shown in the drawings, formed in the inner tube 38, and temporarily fixed with a washer, not shown in the drawings. The inflator 22 is then inserted in this state with the gas ejection outlet facing downwards through the slit 48 into the inner tube 38, and through the slit 48 into the airbag main body section 24. The inner tube 38 is then inserted into the communicating section 36, the stud bolts 40 are inserted through the attachment holes 42 and the attachment holes of the side frame 46, and fastened and fixed with the nuts 44. The side airbag 20 is thereby fixed to the inflator 22 and the like, and also to the side frame 46.

Note that in the manufacturing processes of the side airbag 20 such as those described above, when viewed from the back-face side of the panel 32 (the side that will be the inside face of the airbag main body section 24) as illustrated in FIG. 3A, the fold lines L1, L3, L4 are valley folds, and the fold line L2 is a ridge fold. However, when viewed from the front face side of the panel 32 (the side that will be the outside face (front face) of the airbag main body section 24) as illustrated in FIG. 3B, the fold lines L1, L3, L4 are ridge folds, and the fold line L2 is a valley fold.

Operation and Advantageous Effects

Explanation follows regarding operation and advantageous effects of the first exemplary embodiment.

In the side airbag device 10 configured as described above, the inside of the airbag main body section 24 of the side airbag 20 is segmented by the tether section 30 into the chest chamber 26 and the hip chamber 28. Gas from the inflator 22 is supplied into the chambers 26, 28, when there is for example a vehicle side-on collision. The airbag main body section 24 thereby inflates and deploys between the occupant P and the side door.

In the side airbag 20 described above, the airbag main body section 24 and the tether section 30 are formed by the single-sheet panel 32. However, due to the tether section 30 being formed by partially folding over, superimposing and stitching the single-sheet panel 32, the number of reinforcement panels for reinforcing the tether section 30 can be reduced, or such reinforcement panels can be omitted altogether. The number of panels configuring the side airbag 20 can accordingly be reduced. Moreover, the number of stitched locations of the side airbag 20 can be reduced and the stitching length can also be shortened, enabling an easy sewing operation to be achieved. These factors enable the manufacturing cost of the side airbag 20 to be reduced, enabling greater applicability of the side airbag 20 to mass production.

Note that when manufacturing a side airbag equipped with plural chambers from a single-sheet panel, the interior of the side airbag can be segmented into upper and lower chambers by, for example, providing a stitched section (seam) at an up-down direction intermediate portion of a bag shaped stitched side airbag. However, when configuration is made in this manner, due to inflation of the side airbag no longer occurring in the vicinity of the seam, the contact surface area between the occupant and the side airbag is reduced in the vicinity of the seam. As a result, there is a possibility that the restraining performance is lowered. On the other hand, in a configuration in which the interior of a side airbag stitched in a bag shape from a single-sheet panel is segmented into upper and lower chambers by a tether panel as a separate body, good restraining performance can be achieved since a bag thickness (the thickness dimension along the vehicle width direction when the side airbag is in an inflated and deployed state) of the width of the separate tether panel can be secured. However, there is the possibility of issues arising with respect to such aspects as manufacturing cost and applicability to mass production of such a side airbag with an added separate body for the tether panel. By contrast, in the present exemplary embodiment, although the side airbag 20 is configured stitched from the single-sheet panel 32, good restraining performance can be secured while still eliminating issues of manufacturing cost and applicability to mass production, since the bag thickness for the side airbag 20 of the width of the tether section 30 can be secured.

Moreover, in the side airbag 20, the surplus length section 32A is formed by folding, superimposing and stitching an up-down direction intermediate portion of the single-sheet panel 32, and the tether section 30 is formed by stitching the two length direction sides of the surplus length section 32A. Thus, even supposing the stitching thread of the tether section 30 was to unintentionally break with rising internal pressure of the chest chamber 26 and the hip chamber 28 and the surplus length section 32A open out, the gas sealing capability of the airbag main body section 24 can still be maintained (excellent gas sealing capability). Moreover, there is no need for 3D stitching since the side airbag 20 can be manufactured by stitching in a flat plane. An easy sewing operation can accordingly be achieved.

Moreover, in the present exemplary embodiment, the two length direction sides of the surplus length section 32A are not stitched at the central fold line L1 side of the panel 32. The communicating section 36 that communicates the chest chamber 26 with the hip chamber 28 is formed thereby, and the inflator 22 is inserted into the communicating section 36. Placement space for the inflator 22 can thereby be secured with a simple structure.

Moreover, in the present exemplary embodiment, the inner tube 38 is inserted into the communicating section 36, and the inflator 22 is disposed inside the inner tube 38. The gas ejected from the inflator 22 can accordingly be appropriately distributed by the inner tube 38 to the chest chamber 26 and the hip chamber 28.

Moreover, the hip chamber 28 is deployed earlier and at higher pressure than the chest chamber 26 due to disposing the inflator 22 such that the gas ejection outlet faces downwards, and so initial restraining performance by the hip chamber 28 for the hip region of the occupant P can be raised.

Moreover, the lower end side of the inner tube 38 projects out into the hip chamber 28, and so the lower end side of the inner tube 38 is pressed and squashed in so as to be closed off by rising internal pressure of the hip chamber 28. The gas in the hip chamber 28 can accordingly be prevented from flowing through inside the inner tube 38 and into the chest chamber 26. A state of high internal pressure of the hip chamber 28 can thereby be maintained.

Moreover, configuration is such that any gaps between the inner tube 38 and the tether section 30 can be filled by the inner tube 38 being inflated by the pressure of the gas ejected from the inflator 22. This accordingly enables gas in the hip chamber 28 to be prevented or suppressed from inflowing into the chest chamber 26 through such gaps. A state of high internal pressure of the hip chamber 28 can accordingly be maintained.

Modified Example of First Exemplary Embodiment

Figure 8:
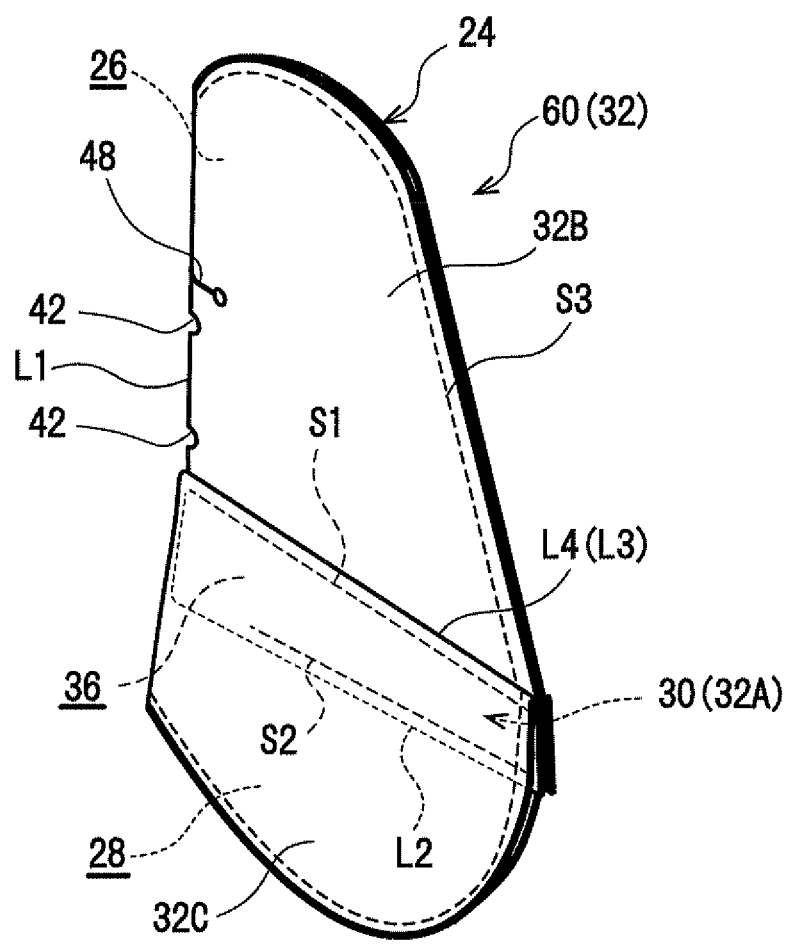
FIG. 8 is perspective view illustrating a modified example of the side airbag according to the first exemplary embodiment of the present invention.
Figure 9A:
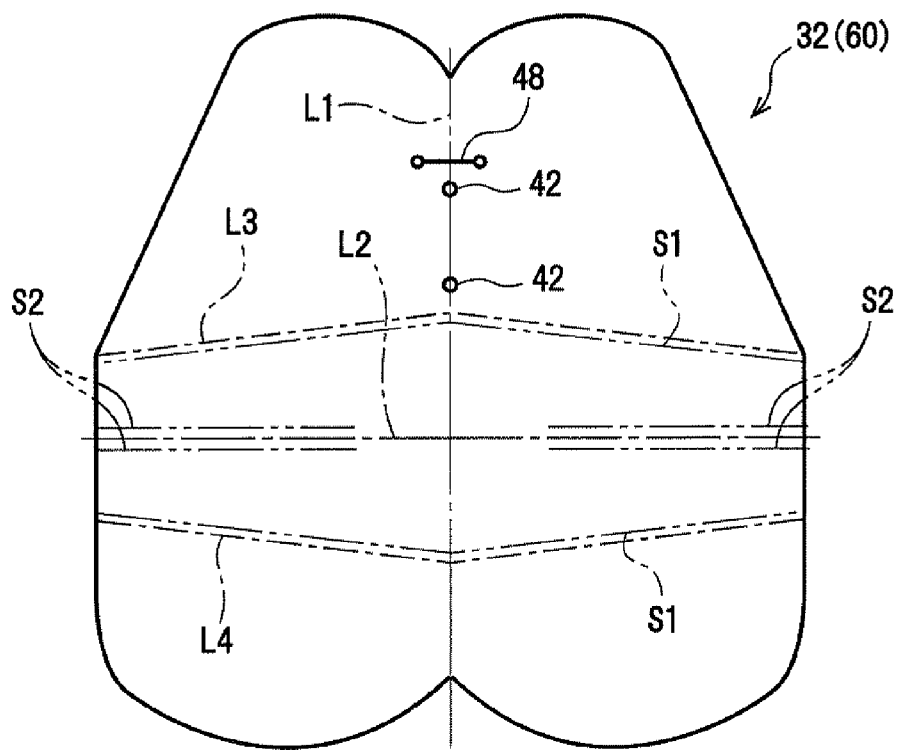
FIG. 9A and FIG. 9B.
Figure 9B:
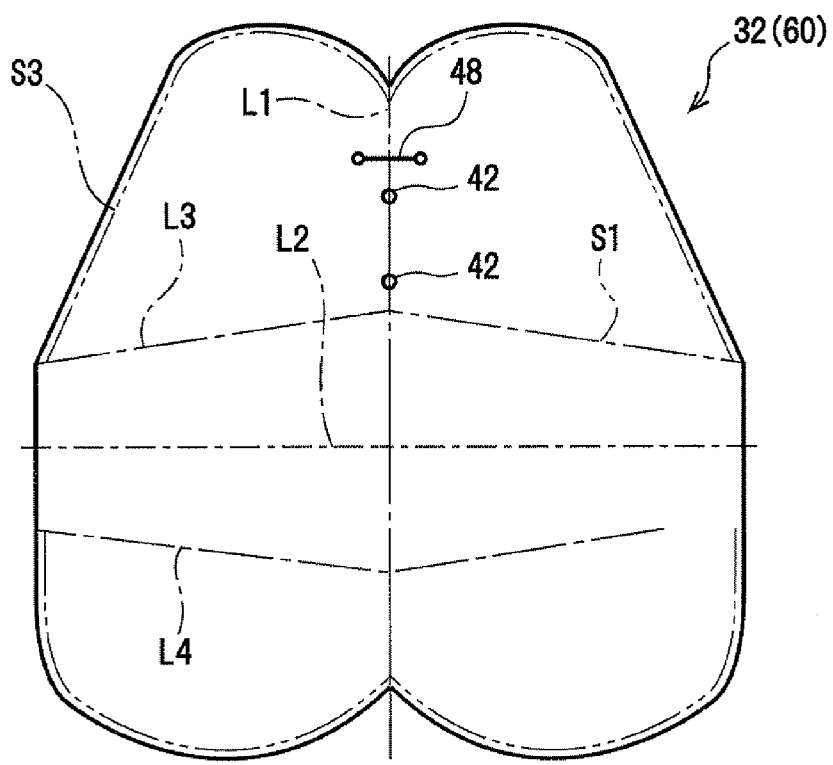

FIG. 8 illustrates a perspective view of a side airbag 60 that is a modified example of the side airbag 20 according to the first exemplary embodiment. FIG. 9A and FIG. 9B are flat opened-out plans corresponding to FIG. 3A and FIG. 3B and illustrate a panel 32 for configuring the side airbag 60 in a flat opened-out state.

The side airbag 60 is configured basically the same as the side airbag 20 according to the first exemplary embodiment, and is stitched from a similar panel 32 to the panel 32 according to the first exemplary embodiment. However, in the side airbag 60, a first stitched section S1 is not set parallel to the fold line L2, and instead the first stitched section S1 is angled such that the distance between the first stitched section S1 and the fold line L2 widens on progress towards the central fold line L1 side. Similarly, fold lines L3, L4 are angled along the first stitched section S1. A tether section 30 (a surplus length section 32A) therefore has a width dimension that increases on progression towards the central fold line L1 side. Configuration is thus such that in the inflated and deployed state of the side airbag 60, the bag thickness of the rear portion side of the side airbag 60 is greater than that of the front portion side. Thus in the present exemplary embodiment the bag thickness can be changed with a simple configuration by simply changing the stitching position of the first stitched section S1.

Supplementary Explanation Regarding the First Exemplary Embodiment

The first exemplary embodiment is configured equipped with the inner tube 38, however the invention according to the first to third aspects of the invention is not limited thereto, and an inner tube may be omitted, such as in cases in which a diffuser of a separate configuration is provided to distribute inflator gas into plural chambers.

Moreover, although in the first exemplary embodiment configuration is made such that the communicating section 36 is configured by not stitching the central fold line L1 (fold line for folding double the panel 32) side at the two length direction ends of the surplus length section 32A, the invention according to the first to third aspects of the invention is not limited thereto. Configuration may be made such that a communicating section is formed by not stitching the two length direction sides on the opposite sides to the fold line for double folding the panel.

Explanation next follows regarding other exemplary embodiments of the present invention. Note that configuration and operation basically the same as those of the first exemplary embodiment are allocated the same reference numerals as in the first exemplary embodiment, and further explanation thereof is omitted.

Second Exemplary Embodiment

Figure 10:
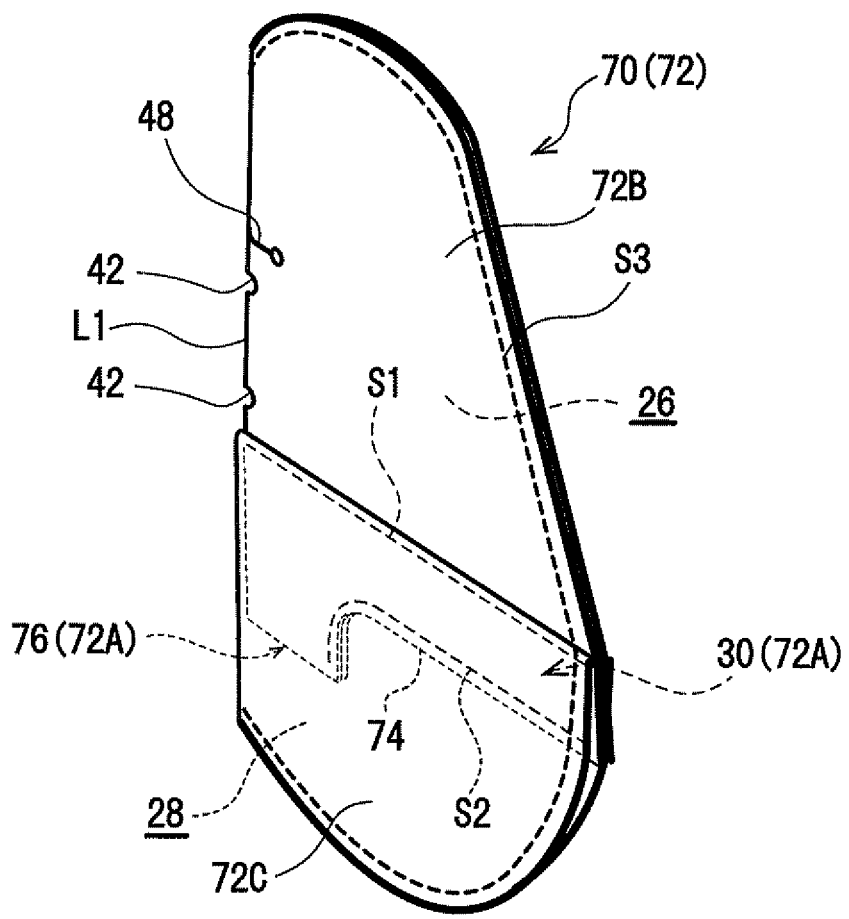
FIG. 10 is a perspective view of a side airbag that is a configuration member of a vehicle side airbag device according to a second exemplary embodiment of the present invention.
Figure 11:
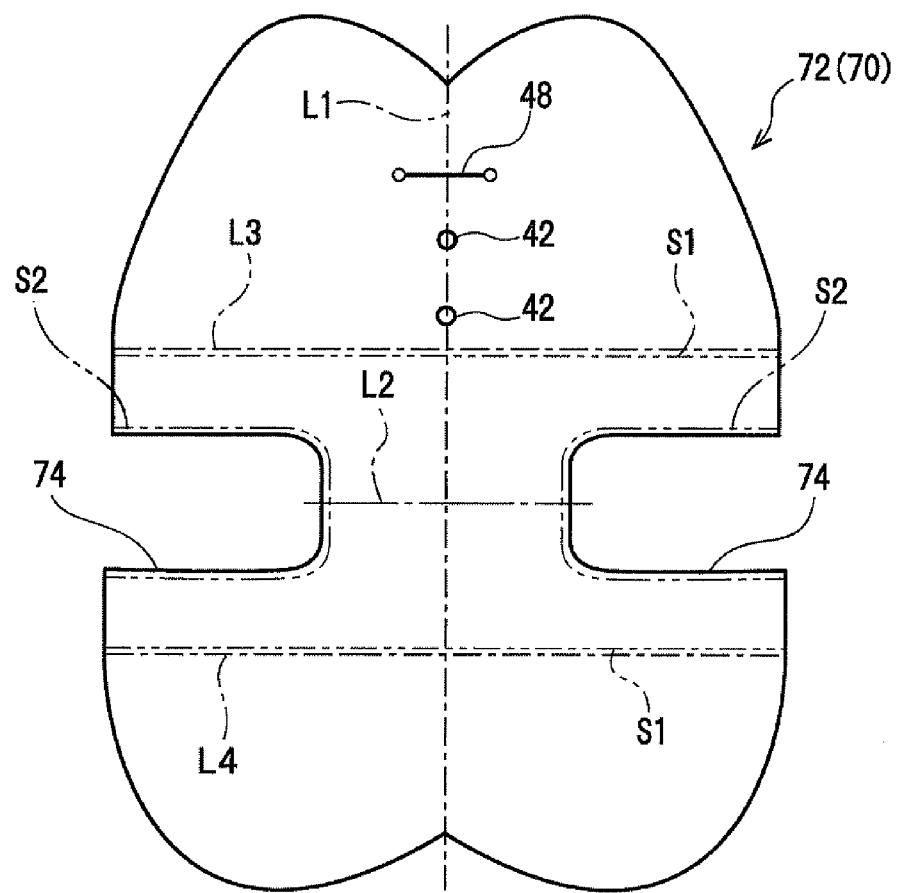
FIG. 11 is a flat opened-out plan, as viewed from the back-face side of a panel configuring the same side airbag.

FIG. 10 is a perspective view of a side airbag 70 that is a configuration member of a vehicle side airbag according to a second exemplary embodiment of the present invention. Note that configuration of the side airbag 70 is basically the same as the side airbag 20 according to the first exemplary embodiment, and the side airbag 70 is configured by stitching a single-sheet panel 72 (see FIG. 11 to FIG. 14) with basically the same configuration as the panel 32 according to the first exemplary embodiment. However, in the flat opened-out state illustrated in FIG. 11, cutout portions 74 are formed in the panel 72 at the left and right two sides of a central fold line L1, so as to be open towards the opposite sides to the central fold line L1. The pair of cutout portions 74 are formed so as to extend along the panel 72 left-right direction with substantially rectangular shapes, and are disposed centered on a fold line L2 that extends left and right.

The panel 72 is folded double at the central fold line L1 and the outer peripheral edge portion of the panel 72 is stitched together at a third stitched section S3. A bag shaped airbag main body section 24 is formed thereby. An up-down direction intermediate portion of the panel 72 (positioned between a fold line L3 and a fold line L4), including edge portions of the pair of cutout portions 74, is also folded over and superimposed such that there is slack towards the inside of the airbag main body section 24. An elongated surplus length section 72A (see FIG. 12) is formed by stitching at a first stitched section S1 set at the side near to the front face of the airbag main body section 24. A tether section 30 and a non-return valve 76 are accordingly formed by stitching along the edge portions of the cutout portions 74 at second stitched sections S2 provided to the surplus length section 72A at the two length direction sides of the central fold line L1 (a length direction one side 72A1 and a length direction other side 72A2) on the far side from the front face of the airbag main body section 24 (the fold line L2 side). Note that FIG. 10, and FIG. 12 to FIG. 14, 72B indicates an upper panel section for forming a chest chamber 26 in the panel 72, and 72C indicates a lower panel section for forming a hip chamber 28 in the panel 72.

The non-return valve 76 referred to above is formed in a substantially tube shape and projects out into the hip chamber 28. Namely, in the present exemplary embodiment, the length dimension of the non-return valve 76 is configured long by setting the separation from the fold line L2 to the first stitched section S1 greater than in the first exemplary embodiment, with the non-return valve 76 projecting out into the hip chamber 28 to a great extent. The inside of the chest chamber 26 and the inside of the hip chamber 28 are accordingly in communication with each other through the inside of the non-return valve 76. Configuration is such that the lower end side of an inflator 22 (see FIG. 1) is inserted into the inside of the non-return valve 76, and gas ejected from a gas ejection outlet provided in the lower end side of the inflator 22 is distributed to the chest chamber 26 and the hip chamber 28 by the non-return valve 76. When doing so, configuration is made such that the hip chamber 28 completes deployment earlier than (in advance of) the chest chamber 26 by disposing the gas ejection outlet of the inflator 22 so as to face downwards. Configuration is also made such that the internal pressure of the hip chamber 28 is higher than the internal pressure of the chest chamber 26, and the bottom end side of the non-return valve 76 is pressed in and squashed closed when the internal pressure of the hip chamber 28 rises to a specific value or greater. The gas in the hip chamber 28 can accordingly be prevented from inflowing into the chest chamber 26 through the non-return valve 76.

Figure 12:
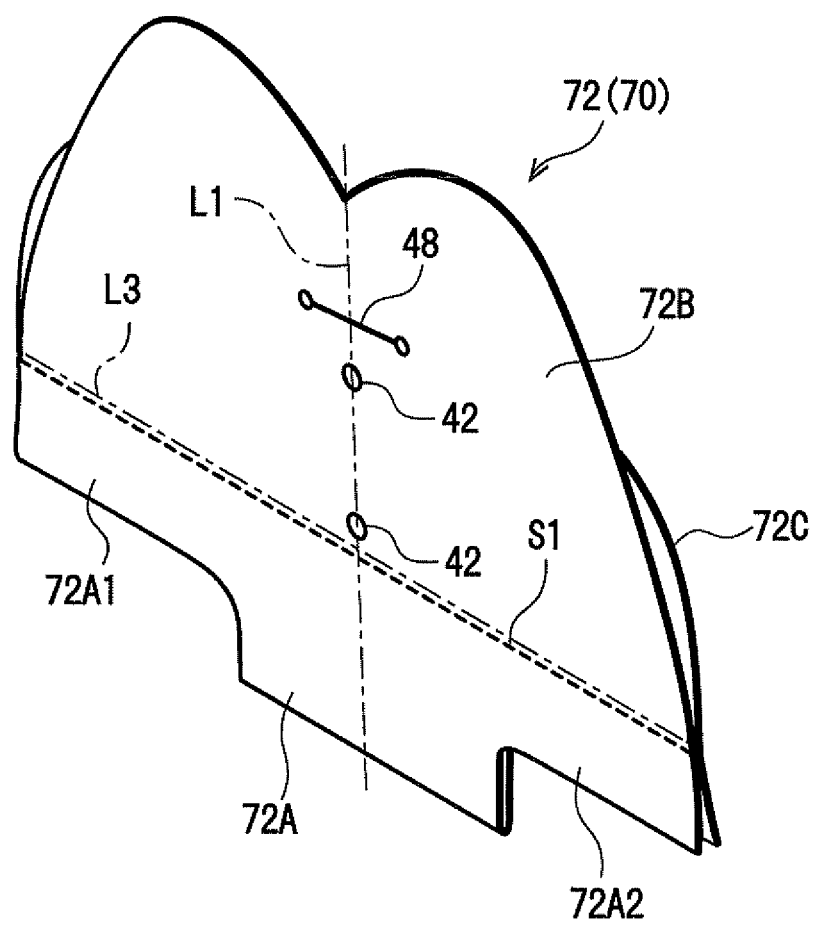
FIG. 12 is a perspective view illustrating a stitched state of a first stitched section of the same panel.
Figure 13:
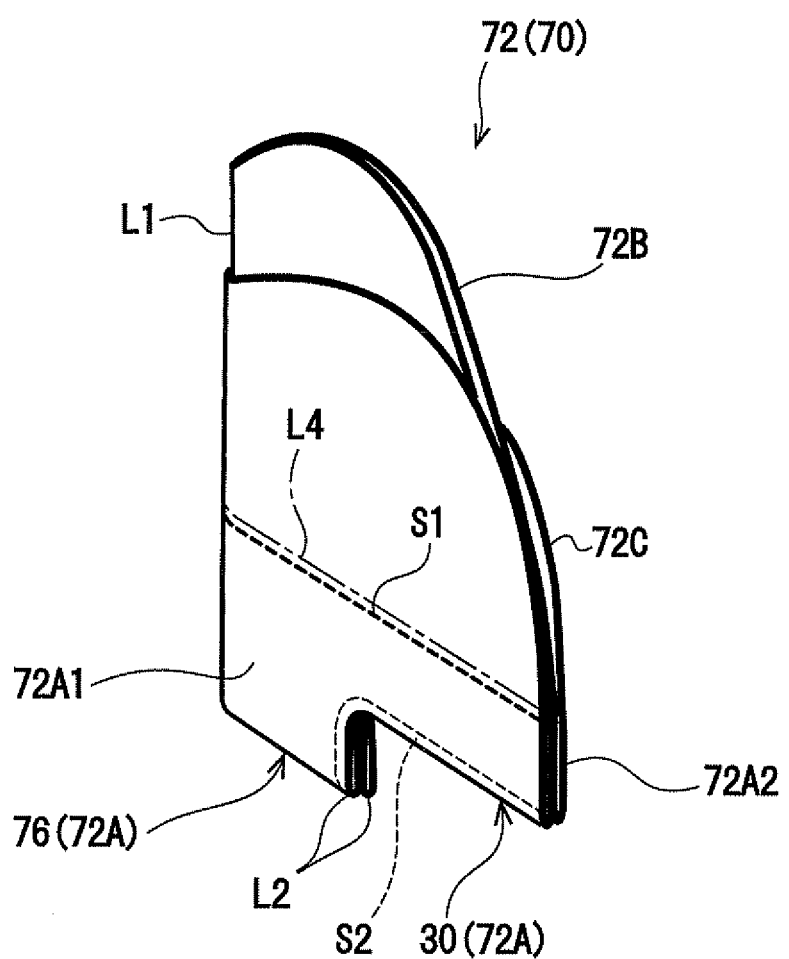
FIG. 13 is a perspective view illustrating a stitched state of a second stitched section of the same panel.
Figure 14:
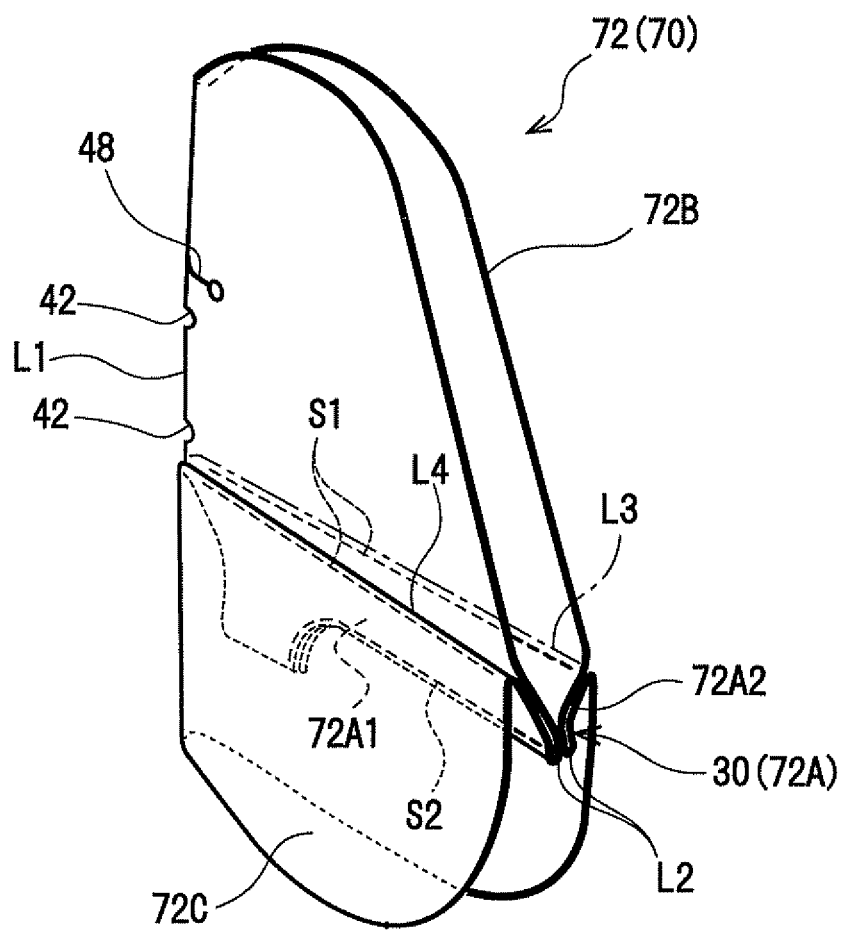
FIG. 14 is a perspective view illustrating a state prior to stitching a third stitched section of the same panel.

Note that the manufacturing method of the side airbag 70 described above (the stitching method of the panel 72) is similar to the manufacturing method of the side airbag 20 according to the first exemplary embodiment other than in that the second stitched section S2 is provided along the edge portion of the pair of cutout portions 74 (see FIG. 12 to FIG. 14).

Operation and Advantageous Effects

In this exemplary embodiment, separate bodies of an inner tube and a non-return valve for distributing gas to the chest chamber 26 and the hip chamber 28 can be dispensed with since the tether section 30 and the non-return valve 76 can be configured from the single-sheet panel 72. The number of panels to configure a side airbag can thereby be reduced even further. Moreover, the non-return valve 76 that is exposed to high temperature and high pressure gas ejected from the inflator 22 is in a three layer superimposed state, made up by the up-down direction intermediate portion (a double-sheet superimposed portion) of the folded over and superimposed panel 72 for configuring the tether section 30 and the non-return valve 76 and the lower panel section 72C. The number of reinforcement panels (reinforcement cloths) for reinforcing the non-return valve 76 can accordingly be reduced, or such reinforcement panels can be omitted altogether. The number of panels can thus be reduced even in a configuration provided with the non-return valve 76.

Moreover, in the present exemplary embodiment, due to the non-return valve 76 projecting out into the hip chamber 28, the non-return valve 76 is squashed in and closed off by the rise in the internal pressure of the hip chamber 28. The internal pressure of the hip chamber 28 can accordingly be maintained at a higher pressure than the internal pressure in the chest chamber 26 using a simple configuration. Moreover, the initial restraining performance on the hip region of the occupant P, that is more robust than the chest region of the occupant P, can be raised due to the hip chamber 28 being deployed earlier and at higher pressure than the chest chamber 26.

Third Exemplary Embodiment

Figure 15:
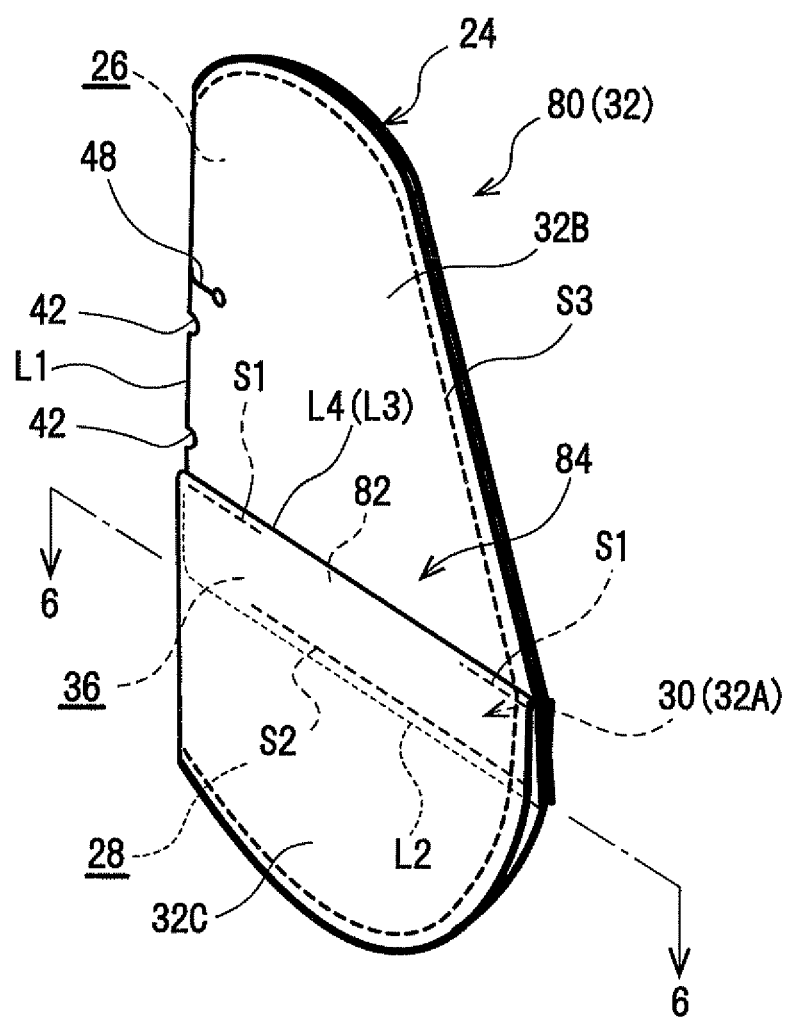
FIG. 15 is a perspective view of a side airbag that is a configuration member of a vehicle side airbag device according to a third exemplary embodiment of the present invention.
Figure 16:
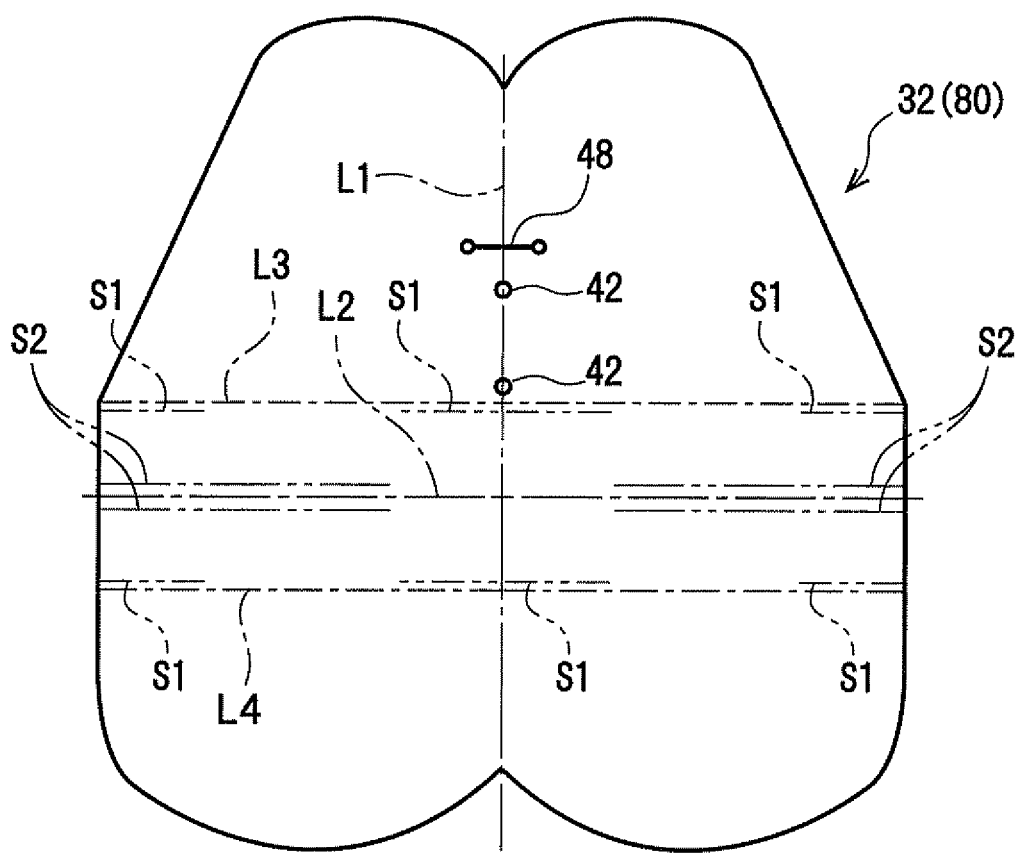
FIG. 16 is a flat opened-out plan of a panel configuring the same side airbag, as viewed from the back-face side.

FIG. 15 illustrates a perspective view of a side airbag 80 that is a configuration member of a vehicle side airbag device according to a third exemplary embodiment of the present invention. FIG. 16 is a flat opened-out plan illustrating a panel 32 for configuring the side airbag 80. The present exemplary embodiment has basically the same configuration as the first exemplary embodiment, with the side airbag 80 formed by stitching a panel 32 similar to the panel 32 according to the first exemplary embodiment. However, in this side airbag 80 a first stitched section S1 is divided into multiple divisions (three in this case). Non-stitched sections 82 (stitching interrupted portions) are also provided between the three divisional first stitched section S1, namely at locations positioned on the vehicle front-rear direction central side of an airbag main body section 24 when the airbag main body section 24 is in an inflated and deployed state. An intermittent stitched section 84 (bag thickness changing section) is accordingly configured thereby. Note that the external appearance of the side airbag 80 under normal circumstances is similar to that of the side airbag 20 according to the first exemplary embodiment.

The side airbag 80 inflates and deploys similarly to the side airbag 20 up to the point where the internal pressure of at least one of the chest chamber 26 and/or the hip chamber 28 (the hip chamber 28 in this case) reaches a set value. However, the airbag main body section 24 starts to inflate at the non-stitched sections 82 when the internal pressure of the hip chamber 28 has reached the set value. Configuration is made such that a surplus length section 32A at the periphery of and including the non-stitched sections 82 thereby opens out, and the bag thickness of the airbag main body section 24 (the side airbag 80) is increased. Moreover, after the above set value is a value such that after the airbag main body section 24 has been inflated and deployed into a gap between an occupant and a door trim (in a latter stage of deployment), a further rise in the internal pressure of the hip chamber 28 is achieved due to more gas from the inflator 22 being supplied into the hip chamber 28. Namely, the internal pressure of the hip chamber 28 is configured so as not to reach the above set value prior to the airbag main body section 24 being inflated and deployed into the gap between the occupant and the door trim.

Operation and Advantageous Effects

In the present exemplary embodiment, the bag thickness of the airbag main body section 24 can be increased by the intermittent stitched section 84 in cases when what is referred to as a pole side impact test is performed (a crash test modeling a case in which the side face of a vehicle collides with a utility pole or the like, in which the side face of a vehicle is impacted against a stationary pole). Namely, in a pole side impact, due to local vehicle deformation, a comparatively large gap between the occupant and the door trim is secured (for example, there is a gap of from 130 mm to 100 mm between the occupant and the door trim). In such cases, the airbag main body section 24 starts to inflate at the non-stitched sections 82 due to the internal pressure in the hip chamber 28 reaching the set value after the airbag main body section has been inflated and deployed into the above gap. Since the surplus length section 32A accordingly deploys at the periphery of and including the non-stitched sections 82, the bag thickness of the airbag main body section 24 is increased, and hence the impact absorption stroke of the airbag main body section 24 can be increased. As a result the occupant can be effectively protected from the impact in a pole side impact.

Moreover, a vehicle body deforms over a wide range (surface area) when what is referred to as a Moving Deformable Barrier (MBD) side impact test is performed (a crash test in which a barrier modeling another vehicle is impacted against the side face of a stationary vehicle), and the gap between the occupant and the door trim becomes much narrower than in a pole side impact (for example, a gap between the occupant and the door trim is from 120 mm to 50 mm). Even in such cases, in the present exemplary embodiment, the airbag main body section 24 can be inflated and deployed into the narrow gap between the occupant and the door trim. Namely, in the present exemplary embodiment, since the bag thickness of the airbag main body section 24 is not increased until the internal pressure of the hip chamber 28 has reached the set value, the airbag main body section 24 can be inflated and deployed even when the gap between the occupant and the door trim is narrow. An occupant can accordingly be protected from the impact of an MDB side impact.

Namely, preferably a large bag thickness of the airbag main body section 24 is set and the impact absorption stroke is increased when a comparatively large gap is secured between the occupant and the door trim by a pole side impact, however a thin bag thickness of the airbag main body section 24 is required and bag deployment performance needs to be prioritized when the gap between the occupant and the door trim is small due to a MDB side impact. Regarding this point, in the present exemplary embodiment, due to the bag thickness of the airbag main body section 24 being increased in the latter stages of deployment of the airbag main body section 24, the occupant protection capability during a pole side impact can be raised without sacrificing bag deployment performance during a MDB side impact.

Moreover, since a high internal pressure of the hip chamber 28 is demanded in order to raise occupant protection capability during a MDB side impact, in the present exemplary embodiment configuration is made such that the internal pressure of the hip chamber 28 becomes greater than the internal pressure of the chest chamber 26, similarly to in the first exemplary embodiment. The occupant protection capability during a MDB side impact can accordingly be raised.

Moreover, in the present exemplary embodiment, due to configuring the intermittent stitched section 84 (the bag thickness changing section) by providing the non-stitched portions 82 between the multi-divisional first stitched sections S1, the bag thickness changing section can be provided with a simple configuration by simply changing the stitching pattern.

Modified Example of Third Exemplary Embodiment

Figure 17:
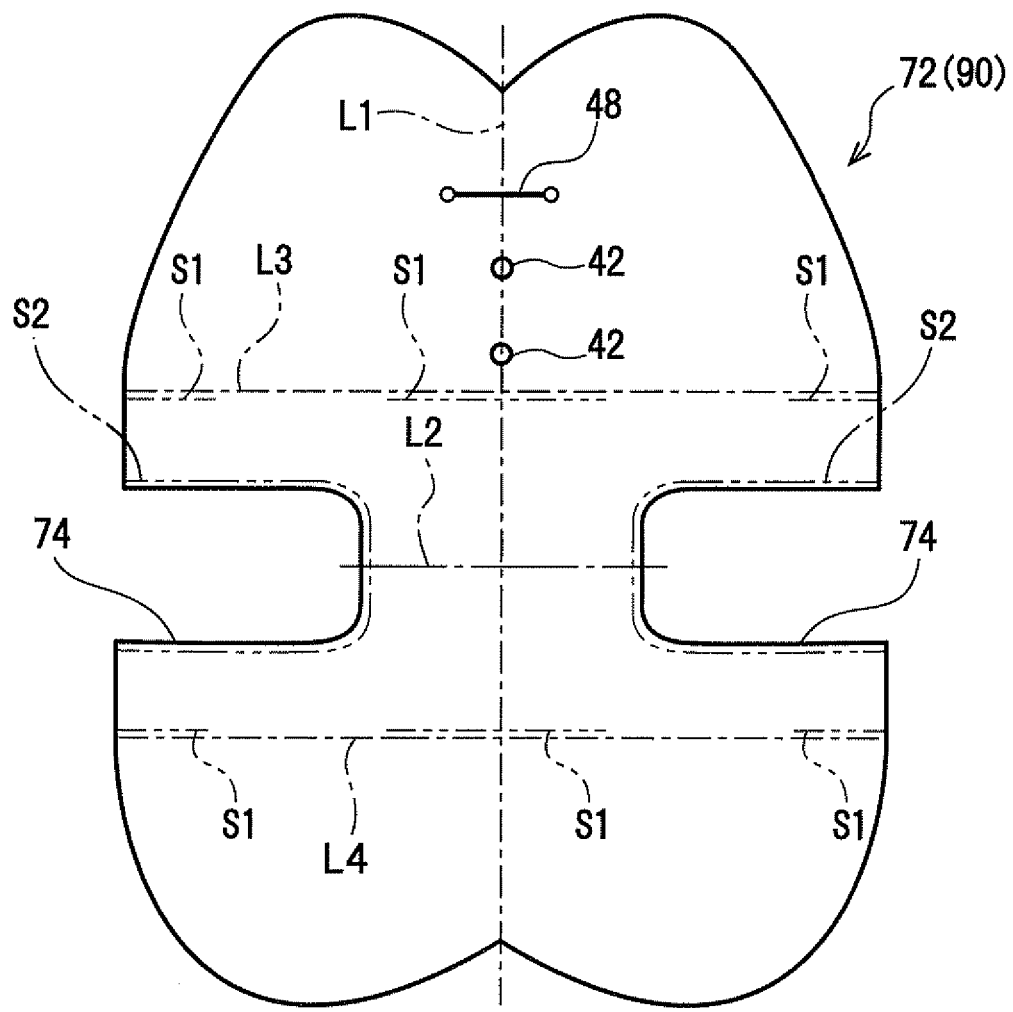
FIG. 17 is a flat opened-out plan illustrating a modified example of the same panel.

FIG. 17 illustrates a flat opened-out plan of a panel 72 configuring a side airbag 90 that is a modified example of the side airbag 80 according to the above third exemplary embodiment. The panel 72 is similar to the panel 72 according to the second exemplary embodiment, and in this modified example, the first stitched section S1 is provided similarly to in the third exemplary embodiment (divided into multiple divisions). Thus an intermittent stitched section similar to the intermittent stitched section 84 according to the third exemplary embodiment can be provided even in the side airbag 90 provided with a non-return valve 76 similar to the side airbag 70 according to the second exemplary embodiment.

Supplementary Explanation of Third Exemplary Embodiment

In the above third exemplary embodiment, explanation has been given of a case in which the intermittent stitched section 84 serves as a bag thickness changing section, however the invention according to the first to eighth aspects of the invention is not limited thereto, and appropriate changes may be made to the configuration of the bag thickness changing section. For example, in the first exemplary embodiment (or the second exemplary embodiment), a tear seam section may be configured by weakening (by setting a lower strength in) the first stitched section S1 compared to the second stitched section S2 and the third stitched section S3, and the tear seam section employed as a bag thickness changing section. In such cases, configuration is made such that the tear seam section ruptures when the internal pressure at least one of the chest chamber 26 and/or the hip chamber 28 reaches a set value. The bag thickness of the airbag main body section 24 can accordingly be increased by the tear seam section rupturing (the stitching thread of the first stitched section S1 breaking) in order to open out a surplus length section 32A (or surplus length section 72A). When configuration is made in such a manner with a tear seam section as the bag thickness changing section, the bag thickness changing section can be provided in a simple configuration simply by making the stitching thread one that easily breaks, or by varying the stitching pattern to one of lower strength.

Fourth Exemplary Embodiment

Figure 18:
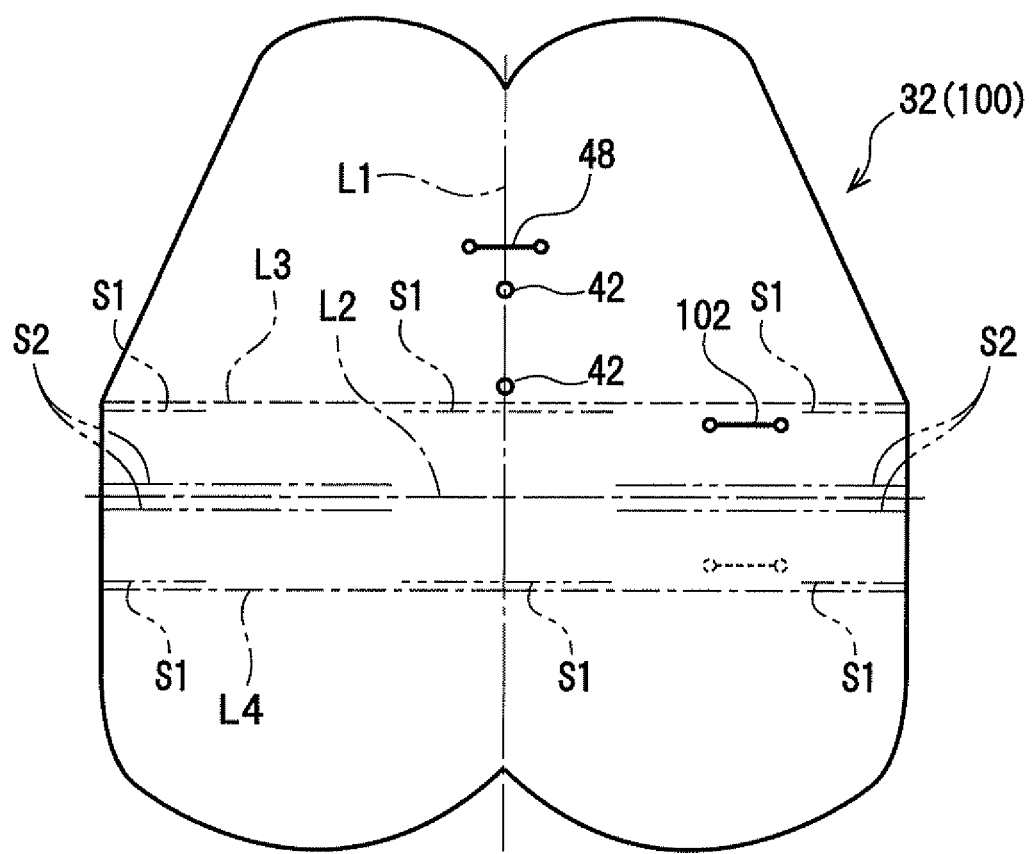
FIG. 18 is a flat opened-out plan, as viewed from the back-face side, of a panel configuring a side airbag that is a configuration member of a vehicle side airbag device according to a fourth exemplary embodiment of the present invention.

FIG. 18 is a flat opened-out plan of a panel 32 for configuring a side airbag 100 that is a configuration member of a vehicle side airbag device according to a fourth exemplary embodiment of the present invention. The present exemplary embodiment has basically the same configuration as that of the third exemplary embodiment. However, a slit shaped vent hole 102 is formed in the present exemplary embodiment at a location configuring one face of a surplus length section 32A of a panel 32 (a location between a fold line L2 and a fold line L3 in FIG. 18). The vent hole 102 is closed off by a location (a location between the fold line L2 and the fold line L4 in FIG. 18) configuring the other face of the surplus length section 32A in a state in which the panel 32 is stitched to form to the side airbag 100. The vent hole 102 is formed in the vicinity of and between the multi-divisional first stitched section S1 (namely at locations provided with the non-stitched portions 82 illustrated in FIG. 15). Note that, as illustrated by the dotted line (dashed line) in FIG. 18, configuration may be made with the vent hole 102 formed at a location on the panel 32 between the fold line L2 and a fold line L4. In such cases, configuration is made such that the vent hole 102 is closed off by the location on the panel 32 between the fold line L2 and the fold line L3.

Operation and Advantageous Effects

In the present exemplary embodiment, when the door trim intrudes into the vehicle compartment during a vehicle side-on collision, an airbag main body section 24 that has inflated and deployed between an occupant and the door trim is compressed between the two members. Accompanying this, the surplus length section 32A at the periphery of the non-stitched portions 82 opens out when the internal pressure of a hip chamber 28 reaches a set value, by the airbag main body section 24 inflating at the non-stitched portions 82. As a result the bag thickness of the airbag main body section 24 increases, the vent hole 102 opens, and gas in the airbag main body section 24 is externally discharged through the vent hole 102. The internal pressure of the airbag main body section 24 can thereby be prevented or suppressed from rising excessively.

Moreover, gas from the inflator 22 is not wasted by external discharge at an initial deployment stage of the airbag main body section 24 since the vent hole 102 is not open. The airbag main body section 24 can accordingly be deployed early between the occupant and the door trim, enabling the occupant initial restraining performance to be raised. Namely, the vent hole 102 is preferably opened during a latter stage of deployment of the airbag main body section 24, and this can be realized in the present exemplary embodiment with a simple configuration by utilizing the intermittent stitched section 84 (the bag thickness changing section) of the third exemplary embodiment.

Modified Example of Fourth Exemplary Embodiment

Figure 19:
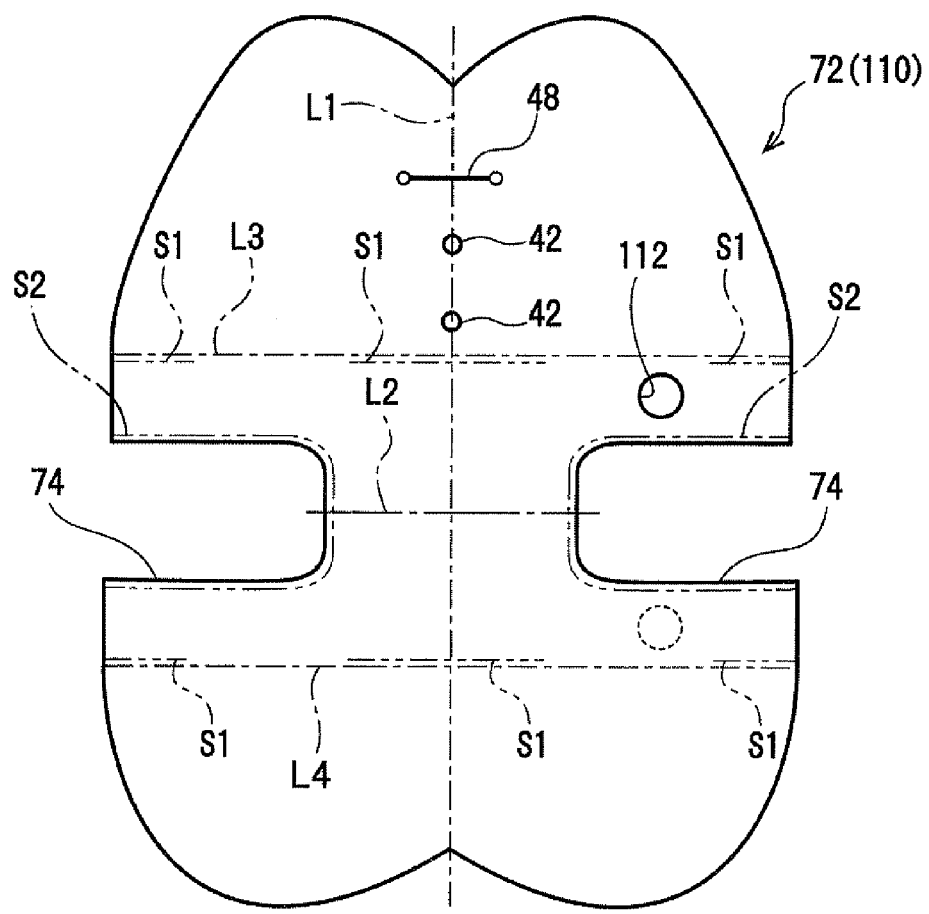
FIG. 19 is a flat opened-out plan illustrating a modified example of the same panel.

FIG. 19 illustrates a flat opened-out plan of a panel 72 configuring a side airbag 110 that is a modified example of the side airbag 100 according to the fourth exemplary embodiment. This modified example is configured basically the same as the modified example of the third exemplary embodiment. However, in this modified example, a circular shaped vent hole 112 is formed at a location configuring one face of a surplus length section 72A of a panel 72 (a location between a fold line L2 and a fold line L3 in FIG. 19). The vent hole 112 is closed off by a location configuring the other face of the surplus length section 72A (a location between the fold line L2 and the fold line L4 in FIG. 19) in a state in which the panel 72 is stitched to form the side airbag 110. The vent hole 112 is formed in the vicinity of and between the multi-division first stitched section S1 (at a non-stitched portion). This modified example also exhibits basically the same operation and advantageous effects to those of the first exemplary embodiment. Note that, as illustrated by the dotted line (dashed line) in FIG. 19, configuration may be made with the vent hole 112 formed at a location on the panel 72 between the fold line L2 and a fold line L4. In such cases, the vent hole 112 is closed off by the location on the panel 72 between the fold line L2 and the fold line L3.

Supplementary Explanation to the Fourth Exemplary Embodiment

In the above fourth exemplary embodiment and its modified example, configuration is made with the vent hole formed in a slit shape or a circular shape, however the invention according to the first to eleventh aspect of the invention is not limited thereto and the shape of the vent hole can be changed as appropriate.

Moreover, although the fourth exemplary embodiment above is configured such that the vent hole 102 opens by utilizing the intermittent stitched section 84 (the bag thickness changing section) according to the third exemplary embodiment, the invention according to the first to eleventh aspect of the invention is not limited thereto. Namely, as explained in the supplementary explanation to the third exemplary embodiment, a vent hole similar to the above vent holes 102, 112 may also be employed in a configuration in which the first stitched section S1 is configured as a tear seam section as in the first exemplary embodiment (or in the second exemplary embodiment). In such cases, configuration is made such that the vent hole is opened by rupturing of the tear seam section by the surplus length section 32A (or the surplus length section 72A) opening out. Basically the same advantageous effects can be obtained in such cases to those of the fourth exemplary embodiment. Moreover, the degrees of freedom for design can be raised in such cases, since the location for forming the vent hole in the panel 32 (or in the panel 72) is not limited to the vicinity of and between the multi-division first stitched section S1 (the non-stitched section). However, the vent hole is preferably provided on the opposite side to that of the occupant (on the door trim side) in order to avoid being affected by gas discharged from the vent hole at high temperature and high pressure. The vent hole is also preferably provided at a location with a low possibility of being closed off by the door trim or the occupant during a side-on impact.

Fifth Exemplary Embodiment

Figure 20:
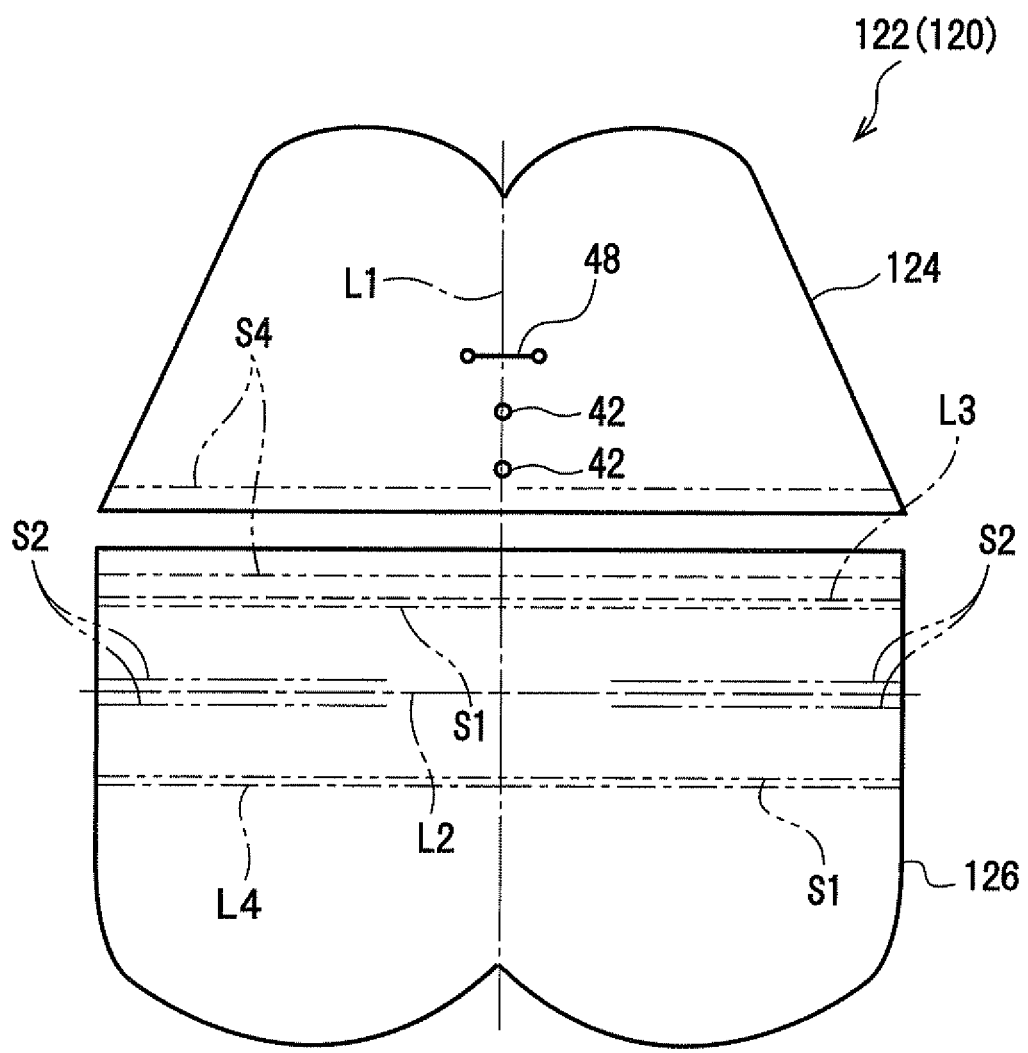
FIG. 20 is a flat opened-out plan, as viewed from the back-face side, of a panel configuring a side airbag that is a configuration member of a vehicle side airbag device according to a fifth exemplary embodiment of the present invention.

FIG. 20 is a flat opened-out plan of a panel 122 for configuring a side airbag 120 that is a configuration member of a vehicle side airbag device according to a fifth exemplary embodiment of the present invention. The present exemplary embodiment has basically the same configuration as the first exemplary embodiment, and the side airbag 120 is formed by partially folding over, superimposing and stitching a single-sheet panel 122 configured basically the same as the panel 32 of the first exemplary embodiment. However, the single-sheet panel 122 is a panel that has been formed by sewing together an upper side base cloth 124 for configuring a chest chamber 26 and a lower side base cloth 126 for configuring a hip chamber 28 and a tether section 30, at a fourth stitched section S4.

The lower side base cloth 126 is a silicone coated cloth that has been subjected to silicon coating (a non-permeable cloth) that has been cut for example by a laser cutting process. The upper side base cloth 124 is a non-coated cloth (permeable cloth) that has not been coated such as with silicone, and has been cut for example by a laser cutting process. The lower side base cloth 126 is accordingly provided with a lower gas permeability than the upper side base cloth 124. The single-sheet panel 122 is formed by stitching together the above upper side base cloth 124 and the lower side base cloth 126 in advance at the fourth stitched section S4, and configuration is made such that the side airbag 120 is formed by stitching the single-sheet panel 122 in a similar manner to the panel 32 according to the first exemplary embodiment. Note that the silicone coated face of the lower side base cloth 126 is stitched so as to be disposed on the interior side of the side airbag 120.

Operation and Advantageous Effects

In the present exemplary embodiment, gas leaks from the hip chamber 28 can be effectively prevented due to the upper side base cloth 124 being provided with a higher gas permeability than the lower side base cloth 126. The internal pressure of the hip chamber 28 can accordingly be set at a higher pressure, and the internal pressure of the chest chamber 26 can be set at a lower pressure, and the internal pressure of the hip chamber 28 can be even more effectively maintained in a high pressure state. As a result, good restraint of the hip region of the occupant, which is more robust than the chest region of the occupant, can be achieved.

Modified Example of Fifth Exemplary Embodiment

Figure 21:
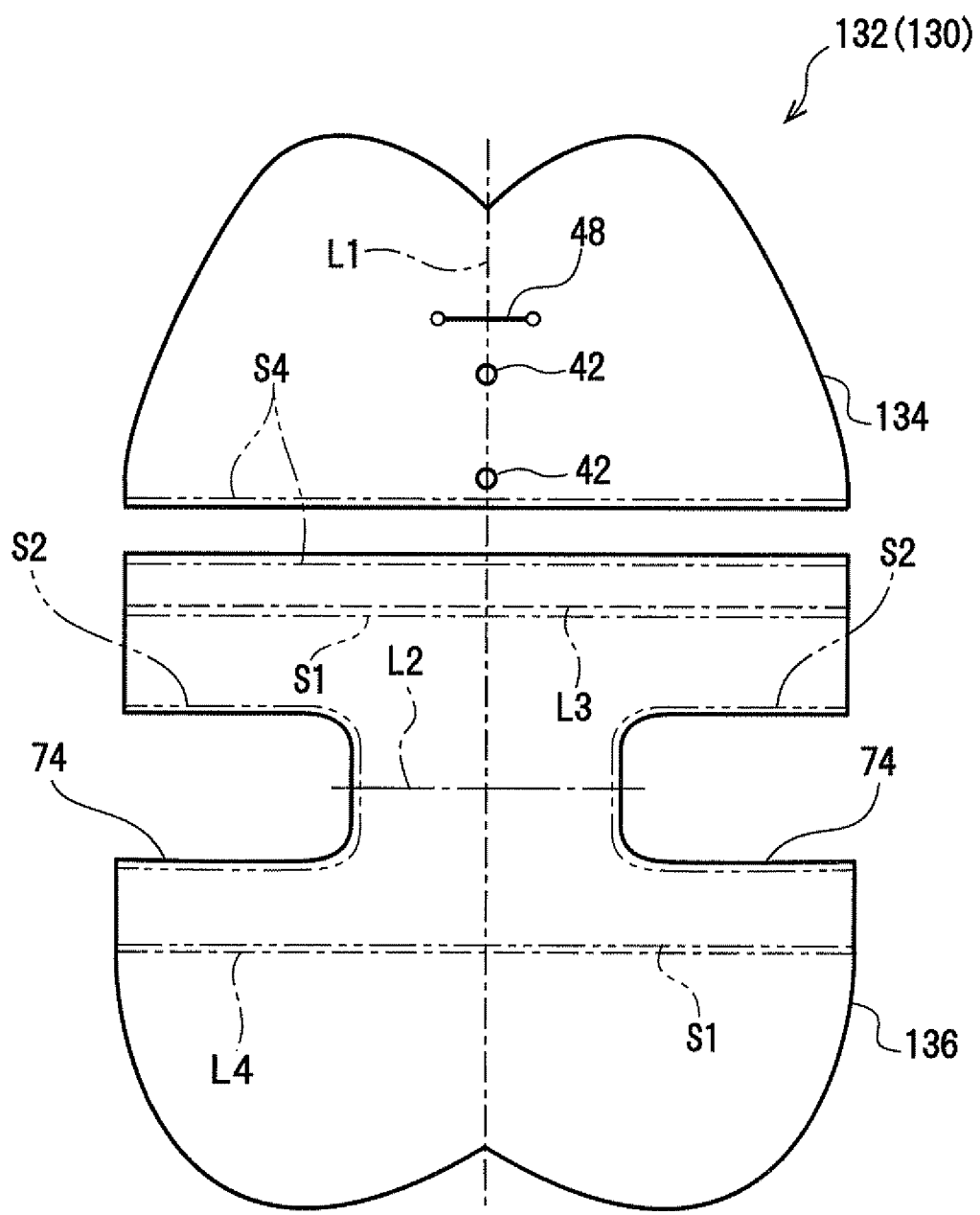
FIG. 21 is a flat opened-out plan illustrating a modified example of the same panel.

FIG. 21 is a flat opened-out plan of a panel 132 for configuring a side airbag 130 that is a modified example of a side airbag 120 according to the fifth exemplary embodiment. This modified example is configured basically the same as the second exemplary embodiment, with the side airbag 130 formed by partially folding over, superimposing and stitching a single-sheet panel 132 with basically the same configuration as the panel 72 according to the first exemplary embodiment. However, this panel 132 is a panel formed by stitching together an upper side base cloth 134 for configuring a chest chamber 26 and a lower side base cloth 136 for configuring a hip chamber 28 and a tether section 30, at a fourth stitched section S4. The upper side base cloth 134 is configured from a non-coated cloth similar to the upper side base cloth 124 according to the fifth exemplary embodiment, and the lower side base cloth 136 is configured from a silicone coated cloth similar to the lower side base cloth 126 according to the fifth exemplary embodiment. This modified example also exhibits basically the same operation and advantageous effects as the fifth exemplary embodiment.

Supplementary Explanation of the Fifth Exemplary Embodiment

Explanation has been given in the above fifth exemplary embodiment of a case in which a silicone coated cloth (coated cloth) and a non-coated cloth are employed as the material for the lower side base cloth 126 and the upper side base cloth 124, however the invention according to the first to eleventh aspects of the invention is not limited thereto, and cloths with different weave density to each other may be employed. Namely, the gas permeability of the lower side base cloth can be made lower than the gas permeability of the upper side base cloth by forming the upper side base cloth with a cloth with a low weave density and forming the lower side base cloth from a cloth with high weave density.

Supplementary Explanation for each of the Exemplary Embodiments

In each of the exemplary embodiments configuration is made such that the interior of the airbag main body section 24 is segmented by a single tether section 30 into the chest chamber 26 (upper chamber) and the hip chamber 28 (lower chamber), however the invention according to the first aspect of the invention is not limited thereto. Configuration may be made with the interior of the airbag main body section sectioned by two tether sections into three chambers (in a configuration referred to as a triple-chamber side airbag).

In addition various other changes may be implemented in a range not departing from the spirit of the present invention. Moreover, the scope of rights of the present invention is not limited by each of the above exemplary embodiments.

The invention claimed is:

1. A vehicle side airbag device comprising:
    a side airbag in which a bag shaped airbag main body section is formed by double folding a single-sheet panel and stitching together outer peripheral edge portions of the single-sheet panel, and in which the interior of the double folded single-sheet panel is sectioned into upper and lower chambers by one tether section or a plurality of tether sections by partially folding over, superimposing and stitching the panel; and
    an inflator that supplies gas into the upper and lower chambers when a vehicle is involved in a side-on collision.

2. The vehicle side airbag device of claim 1, wherein:
    a surplus length section is formed in an elongated tube shape by folding over and superimposing an up-down direction intermediate portion of the panel, such that there is slack on the interior side of the airbag main body section, and stitching on the side of the surplus length section near to the front face of the airbag main body section; and
    the tether section is formed by stitching together the surplus length section at two length direction sides of a fold line of the double folding at a side of the surplus length section away from the front face of the airbag main body section.

3. The vehicle side airbag device of claim 2, wherein:
    a communicating section that communicates the upper and lower chambers through the tether section is formed by not stitching together the two length direction sides of the surplus length section on the fold line side or on the side opposite to the fold line; and
    the inflator is inserted into the communicating section.

4. The vehicle side airbag device of claim 3, wherein:
    the inflator is disposed inside an inner tube inserted into the communicating section;
    gas ejected from the inflator is distributed to the upper and lower chambers by the inner tube;
    a lower end side of the inner tube projects out into a chamber below the tether section; and
    the lower chamber is configured to deploy earlier and at a higher pressure than a chamber above the tether section.

5. The vehicle side airbag device of claim 2, wherein:
    the side airbag comprises a bag thickness changing section that increases a thickness dimension of the airbag main body section in a vehicle width direction when internal pressure in at least one of the upper and lower chambers above or below the tether section reaches a set value.

6. The vehicle side airbag device of claim 5, wherein the bag thickness changing section is a tear seam section configured by a stitched section on the side of the surplus length section near to the front face of the airbag main body section that is made weaker than other stitched sections, and is configured such that the tear seam section ruptures in a case in which the at least one internal pressure reaches the set value.

7. The vehicle side airbag device of claim 6, wherein a vent hole is formed in a location of the panel configuring one face of the surplus length section.

8. The vehicle side airbag device of claim 5, wherein the bag thickness changing section is an intermittent stitched section configured by a multi-division stitched section on the side of the surplus length section near to the front face of the airbag main body section with one or more non-stitched sections provided between the divided stitched sections, configured such that the airbag main body section starts to inflate at the one or more non-stitched sections in a case in which the at least one internal pressure reaches the set value.

9. The vehicle side airbag device of claim 2, wherein:
- the interior of the airbag main body section is sectioned by the tether section into an upper chamber and a lower chamber; and
- the panel is configured by stitching or joining together in advance an upper side base cloth that configures the upper chamber and a lower side base cloth that is provided with a lower gas permeability than the upper side base cloth and that configures the lower chamber and the tether section.

10. The vehicle side airbag device of claim 1, wherein:
- cutout sections are formed at the panel in a flat opened-out state at the two sides of a fold line of the double folding with the cutout sections respectively open towards the opposite sides from the fold line;
- an elongated surplus length section is formed by folding over and superimposing an up-down direction intermediate portion of the panel including edge portions of the pair of cutout sections, such that there is slack on the interior side of the airbag main body section, and stitching on the side of the surplus length section near to the front face of the airbag main body section;
- the tether section and a non-return valve section are formed by stitching together the surplus length section along edge portions of the cutout sections at the two length direction sides of the fold line at the sides away from the front face of the airbag main body section; and
- the upper and lower chambers above and below the tether section are in communication with each other through the inside of the non-return valve section.

11. The vehicle side airbag device of claim 10, wherein:
- the non-return valve section projects out into a chamber below the tether section; and
- configuration is made such that the lower chamber is deployed earlier and at higher pressure than a chamber above the tether section.

\* \* \* \* \*